US009625075B2

(12) United States Patent
Smith et al.

(10) Patent No.: US 9,625,075 B2
(45) Date of Patent: Apr. 18, 2017

(54) APPARATUS WITH A LIQUID-IMPREGNATED SURFACE TO FACILITATE MATERIAL CONVEYANCE

(71) Applicant: Massachusetts Institute of Technology, Cambridge, MA (US)

(72) Inventors: J. David Smith, Arlington, MA (US); Rajeev Dhiman, Glastonbury, CT (US); Adam T. Paxson, Cambridge, MA (US); Christopher J. Love, Atlantis, FL (US); Brian R. Solomon, Rockville, MD (US); Kripa K. Varanasi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 799 days.

(21) Appl. No.: 13/902,718

(22) Filed: May 24, 2013

(65) Prior Publication Data
US 2013/0333789 A1   Dec. 19, 2013

Related U.S. Application Data

(60) Provisional application No. 61/651,542, filed on May 24, 2012.

(51) Int. Cl.
*F16L 55/00* (2006.01)
*F16L 58/04* (2006.01)

(52) U.S. Cl.
CPC .............. *F16L 55/00* (2013.01); *F16L 58/04* (2013.01)

(58) Field of Classification Search
CPC .................................. F16L 55/00; F16L 58/04
See application file for complete search history.

(56) References Cited

U.S. PATENT DOCUMENTS 4,069,933 A    1/1978 Newing
4,125,152 A   11/1978 Kestner et al.
(Continued)

FOREIGN PATENT DOCUMENTS

CN      1721030 A      1/2006
CN    100344341 C     10/2007
(Continued)

OTHER PUBLICATIONS

Chaudhuri et al., Dynamic Contact Angles on PTFE Surface by Aqueous Surfactant Solution in Absence and Presence of Electrolytes, Journal of Colloid and Interface Science, 337:555-562 (2009).
(Continued)

*Primary Examiner* — Michael C Miggins
(74) *Attorney, Agent, or Firm* — Wolf, Greenfield & Sacks, P.C.

(57) ABSTRACT

Described herein are conduits for conveying fluids and/or solids, the conduits having an interior surface that provide a high-slip boundary condition, thereby facilitating the flow of material therethrough. In some embodiments, the conduit has an interior surface with an impregnating liquid and a plurality of micro-scale and/or nano-scale solid features spaced sufficiently close to stably contain the impregnating liquid therebetween. The impregnating liquid fills spaces between the solid features, the interior surface stably contains the impregnating liquid between the solid features, and the impregnating liquid is substantially held in place between the plurality of solid features regardless of orientation of the interior surface and regardless of flow, passage, or removal of fluids and/or solids through, into, or out of the conduit.

25 Claims, 22 Drawing Sheets

(56) References Cited

U.S. PATENT DOCUMENTS

| | | |
|---|---|---|
| 4,204,021 A | 5/1980 | Becker |
| 4,316,745 A | 2/1982 | Blount |
| 4,503,099 A | 3/1985 | Chang et al. |
| 5,083,606 A | 1/1992 | Brown et al. |
| 5,133,516 A | 7/1992 | Marentic et al. |
| 5,154,741 A | 10/1992 | da Costa Filho |
| 5,624,713 A | 4/1997 | Ramer |
| 5,816,280 A | 10/1998 | Rojey et al. |
| 5,817,898 A | 10/1998 | Delion et al. |
| 5,853,802 A | 12/1998 | Boyer et al. |
| 5,900,516 A | 5/1999 | Talley et al. |
| 5,936,040 A | 8/1999 | Costello et al. |
| 6,028,234 A | 2/2000 | Heinemann et al. |
| 6,093,862 A | 7/2000 | Sinquin et al. |
| 6,216,472 B1 | 4/2001 | Cathenaut et al. |
| 6,247,603 B1 | 6/2001 | Farrell et al. |
| 6,329,490 B1 | 12/2001 | Yamashita et al. |
| 6,389,820 B1 | 5/2002 | Rogers et al. |
| 7,041,363 B2 | 5/2006 | Krohmer et al. |
| 7,323,221 B2 | 1/2008 | Heppekausen et al. |
| 7,458,384 B1 | 12/2008 | Seal et al. |
| 7,597,148 B2 | 10/2009 | O'Malley et al. |
| 7,622,197 B2 | 11/2009 | Balow et al. |
| 7,687,593 B2 | 3/2010 | Yamahiro et al. |
| 7,722,951 B2 | 5/2010 | Li et al. |
| 7,887,934 B2 | 2/2011 | Gentleman et al. |
| 7,892,660 B2 | 2/2011 | Gentleman et al. |
| 7,897,271 B2 | 3/2011 | Gentleman et al. |
| 7,901,798 B2 | 3/2011 | Gentleman et al. |
| 7,977,267 B2 | 7/2011 | Gentleman et al. |
| 7,985,451 B2 | 7/2011 | Luzinov et al. |
| 8,057,922 B2 | 11/2011 | Gentleman et al. |
| 8,057,923 B2 | 11/2011 | Gentleman et al. |
| 8,062,775 B2 | 11/2011 | Gentleman et al. |
| 8,173,279 B2 | 5/2012 | Gentleman et al. |
| 8,178,219 B2 | 5/2012 | Gentleman et al. |
| 8,222,172 B2 | 7/2012 | Gentleman et al. |
| 8,235,096 B1 | 8/2012 | Mahefkey et al. |
| 8,236,432 B2 | 8/2012 | Gentleman et al. |
| 8,252,259 B2 | 8/2012 | Seal et al. |
| 8,377,390 B1 | 2/2013 | Brueck et al. |
| 8,535,779 B1 | 9/2013 | Smith et al. |
| 8,574,704 B2 | 11/2013 | Smith et al. |
| 8,859,090 B2 | 10/2014 | Angelescu et al. |
| 8,940,361 B2 | 1/2015 | Smith et al. |
| 9,254,496 B2 | 2/2016 | Dhiman et al. |
| 9,309,162 B2 | 4/2016 | Azimi et al. |
| 9,371,173 B2 | 6/2016 | Smith et al. |
| 9,381,528 B2 | 7/2016 | Dhiman et al. |
| 2002/0164443 A1 | 11/2002 | Oles et al. |
| 2003/0017303 A1 | 1/2003 | Shindo et al. |
| 2003/0096083 A1 | 5/2003 | Morgan et al. |
| 2003/0134035 A1 | 7/2003 | Lamb et al. |
| 2003/0203117 A1 | 10/2003 | Bartkowiak et al. |
| 2003/0226806 A1 | 12/2003 | Young et al. |
| 2004/0026832 A1 | 2/2004 | Gier et al. |
| 2004/0037961 A1 | 2/2004 | Dieleman et al. |
| 2004/0219373 A1 | 11/2004 | Deruelle et al. |
| 2004/0243249 A1 | 12/2004 | Ishihara et al. |
| 2005/0003146 A1 | 1/2005 | Spath |
| 2005/0009953 A1 | 1/2005 | Shea |
| 2005/0016489 A1 | 1/2005 | Endicott et al. |
| 2005/0061221 A1 | 3/2005 | Paszkowski |
| 2005/0112326 A1 | 5/2005 | Nun et al. |
| 2005/0136217 A1 | 6/2005 | Barthlott et al. |
| 2005/0208272 A1 | 9/2005 | Groll |
| 2006/0007515 A1 | 1/2006 | Simonian et al. |
| 2006/0013735 A1 | 1/2006 | Engelking et al. |
| 2006/0078724 A1 | 4/2006 | Bhushan et al. |
| 2006/0147675 A1 | 7/2006 | Nun et al. |
| 2006/0204738 A1 | 9/2006 | Dubrow et al. |
| 2006/0240218 A1 | 10/2006 | Parce |
| 2006/0246226 A1 | 11/2006 | Dai et al. |
| 2007/0026193 A1 | 2/2007 | Luzinov et al. |
| 2007/0031639 A1 | 2/2007 | Hsu et al. |
| 2007/0135602 A1 | 6/2007 | Yamahiro et al. |
| 2007/0207335 A1 | 9/2007 | Karandikar et al. |
| 2007/0231542 A1 | 10/2007 | Deng et al. |
| 2007/0282247 A1 | 12/2007 | Desai et al. |
| 2007/0298216 A1 | 12/2007 | Jing et al. |
| 2008/0026505 A1 | 1/2008 | Chakrapani |
| 2008/0085070 A1 | 4/2008 | Hirata et al. |
| 2008/0118763 A1 | 5/2008 | Balow et al. |
| 2008/0213461 A1 | 9/2008 | Gill et al. |
| 2008/0225378 A1 | 9/2008 | Weikert et al. |
| 2009/0124520 A1 | 5/2009 | Tohidi |
| 2009/0155609 A1 | 6/2009 | Gentleman et al. |
| 2009/0185867 A1 | 7/2009 | Masters et al. |
| 2009/0211735 A1 | 8/2009 | Stenkamp et al. |
| 2009/0231273 A1 | 9/2009 | Lashina et al. |
| 2009/0289213 A1 | 11/2009 | Pipper et al. |
| 2010/0004373 A1 | 1/2010 | Zhu et al. |
| 2010/0028604 A1 | 2/2010 | Bhushan et al. |
| 2010/0028615 A1 | 2/2010 | Hwang et al. |
| 2010/0092621 A1 | 4/2010 | Akutsu et al. |
| 2010/0098909 A1 | 4/2010 | Reyssat et al. |
| 2010/0112286 A1 | 5/2010 | Bahadur et al. |
| 2010/0143620 A1 | 6/2010 | Ajdelsztajn et al. |
| 2010/0147441 A1 | 6/2010 | Nakagawa et al. |
| 2010/0151197 A1 | 6/2010 | Gentleman et al. |
| 2010/0180952 A1 | 7/2010 | Verhelst et al. |
| 2010/0200094 A1 | 8/2010 | Ermakov |
| 2010/0218517 A1 | 9/2010 | Luther |
| 2010/0285229 A1 | 11/2010 | Elbahri et al. |
| 2010/0285275 A1 | 11/2010 | Baca et al. |
| 2010/0307922 A1 | 12/2010 | Wu |
| 2010/0330146 A1 | 12/2010 | Chauhan et al. |
| 2010/0330340 A1 | 12/2010 | Rothstein et al. |
| 2011/0042850 A1 | 2/2011 | Hong et al. |
| 2011/0077172 A1 | 3/2011 | Aizenberg et al. |
| 2011/0094883 A1 | 4/2011 | Ito et al. |
| 2011/0106504 A1 | 5/2011 | Noureldin |
| 2011/0201984 A1 | 8/2011 | Dubrow et al. |
| 2011/0226998 A1 | 9/2011 | Van De Weijer-Wagemans et al. |
| 2011/0240130 A1 | 10/2011 | Den Dulk et al. |
| 2011/0283778 A1 | 11/2011 | Angelescu et al. |
| 2011/0287217 A1 | 11/2011 | Mazumder et al. |
| 2012/0000848 A1 | 1/2012 | Lyons et al. |
| 2012/0000853 A1 | 1/2012 | Tuteja et al. |
| 2012/0036846 A1 | 2/2012 | Aizenberg et al. |
| 2012/0128963 A1 | 5/2012 | Mao et al. |
| 2012/0248020 A1 | 10/2012 | Granick et al. |
| 2013/0003258 A1 | 1/2013 | Xie et al. |
| 2013/0032316 A1 | 2/2013 | Dhiman et al. |
| 2013/0034695 A1 | 2/2013 | Smith et al. |
| 2013/0062285 A1 | 3/2013 | Hoek et al. |
| 2013/0122225 A1 | 5/2013 | Azimi et al. |
| 2013/0123389 A1 | 5/2013 | Zhu et al. |
| 2013/0146536 A1 | 6/2013 | Tarabara et al. |
| 2013/0220813 A1 | 8/2013 | Anand et al. |
| 2013/0227972 A1 | 9/2013 | Hatton et al. |
| 2013/0251769 A1 | 9/2013 | Smith et al. |
| 2013/0251942 A1 | 9/2013 | Azimi et al. |
| 2013/0251946 A1 | 9/2013 | Azimi et al. |
| 2013/0251952 A1 | 9/2013 | Smith et al. |
| 2013/0333789 A1 | 12/2013 | Smith et al. |
| 2013/0335697 A1 | 12/2013 | Smith et al. |
| 2013/0337027 A1 | 12/2013 | Smith et al. |
| 2013/0340840 A1 | 12/2013 | Anand et al. |
| 2014/0141263 A1 | 5/2014 | Jones et al. |
| 2014/0147627 A1 | 5/2014 | Aizenberg et al. |
| 2014/0178611 A1 | 6/2014 | Smith et al. |
| 2014/0290699 A1 | 10/2014 | Bengaluru Subramanyam et al. |
| 2014/0291420 A1 | 10/2014 | Dhiman et al. |
| 2015/0111063 A1 | 4/2015 | Khan et al. |
| 2015/0125575 A1 | 5/2015 | Smith et al. |
| 2015/0179321 A1 | 6/2015 | Khalil et al. |
| 2015/0306642 A1 | 10/2015 | Smith et al. |
| 2016/0296985 A1 | 10/2016 | Dhiman et al. |

FOREIGN PATENT DOCUMENTS

| | | |
|---|---|---|
| CN | 102002298 A | 4/2011 |
| CN | 101269960 B | 5/2011 |

(56) References Cited

FOREIGN PATENT DOCUMENTS

| | | |
|---|---|---|
| DE | 198 18 956 A1 | 11/1998 |
| EP | 0230112 A2 | 7/1987 |
| EP | 1892458 A1 | 2/2008 |
| JP | 1 170932 A | 7/1989 |
| JP | 5 240251 A | 9/1993 |
| JP | 2004 037764 A | 2/2004 |
| JP | 2007-278090 A | 10/2007 |
| JP | 2008-223003 A | 9/2008 |
| JP | 2008240910 A | 10/2008 |
| TW | I 233-968 B | 6/2005 |
| WO | WO-93/17077 A1 | 9/1993 |
| WO | WO-99/36490 A1 | 7/1999 |
| WO | WO 01/38288 A1 | 5/2001 |
| WO | WO-02/062568 A2 | 8/2002 |
| WO | WO 03/13827 A1 | 2/2003 |
| WO | WO-03/071275 A1 | 8/2003 |
| WO | WO-2006/017009 A2 | 2/2006 |
| WO | WO-2006/091235 A1 | 8/2006 |
| WO | WO-2006/132892 A2 | 12/2006 |
| WO | WO-2007/019362 A1 | 2/2007 |
| WO | WO-2008/111603 A1 | 9/2008 |
| WO | WO-2009/009185 A2 | 1/2009 |
| WO | WO 2010/028752 A1 | 3/2010 |
| WO | WO-2010/082710 A1 | 7/2010 |
| WO | WO-2010/096073 A1 | 8/2010 |
| WO | WO-2010/129807 A1 | 11/2010 |
| WO | WO-2011/087458 A1 | 7/2011 |
| WO | WO-2011/143371 A1 | 11/2011 |
| WO | WO-2012/024099 A1 | 2/2012 |
| WO | WO-2012/100099 A2 | 7/2012 |
| WO | WO-2012/100100 A2 | 7/2012 |
| WO | WO-2013/022467 A2 | 2/2013 |
| WO | WO-2013/130118 A1 | 9/2013 |
| WO | WO-2013/141888 A1 | 9/2013 |
| WO | WO-2013/141953 A2 | 9/2013 |

OTHER PUBLICATIONS

Good, Robert J., Contact angle, wetting and adhesion: a critical review, J. Adhesion Sci. Technol. vol. 6, No. 12, pp. 1269-1302 (1992).
Grace, J., Energy From Gas Hydrates: Assessing the Opportunities and Challenges for Canada, Council of Canadian Academies, Jul. 2008, 8 pages.
Sloan, Jr., E. Dendy, Fundamental Principles and Applications of Natural Gas Hydrates, Nature Publishing Group, 353-359 (2003), 7 pages.
Sum, Amadeu K. et al, Clathrate Hydrates: From Laboratory Science to Engineering Practice, American Chemical Society, Ind. Eng. Chem. Res., vol. 48, No. 16, pp. 7457-7465, Jul. 22, 2009, 9 pages.
Tropmann et al., Completely Superhydrophobic PDMS Surfaces for Microfluidics, Langmuir, ACS Publications (2012).
Allain et al., A New Method for Contact-Angle Measurements of Sessile Drops, Journal of Calloid and Interface Science, vol. 107, No. 1, Sep. 1985, 9 pages.
Anand et al., Enhanced Condensation on Lubricant-Impregnated Nanotextured Surfaces. ACS Nano, 6(11):10122-10129 (2012).
Antonini et al., Water Drops Dancing on Ice: How Sublimation Leads to Drop Rebound, PRL 111, 014501 (2013).
Arkles, Hydrophobicity, Hydrophilicity and Silanes, Paint and Coatings Industry, Oct. 1, 2006, 10 pages.
Ashkin et al., Optical levitation by radiation pressure. Applied Physics Letters, 19(8):283-285 (1971).
Ashkin et al., Optical levitation of liquid drops by radiation pressure. Science, 187(4181):1073-1075 (1975).
Avedisian et al., Leidenfrost boiling of methanol droplets on hot porous/ceramic surfaces. International Journal of Heat and Mass Transfer, 30(2):379-393 (1987).
Baier et al., Propulsion Mechanisms for Leidenfrost Solids on Ratchet Surfaces. arXiv preprint arXiv:1208.5721 (2012).

Baier et al., Propulsion mechanisms for Leidenfrost solids on ratchets. Physical Review E—Statistical, Nonlinear, and Soft Matter Physics, 87(2) (2013).
Barnes, Geoff T., The Potential for Monolayers to Reduce the Evaporation of Water From Large Water Storages, Agricultural Water Management 95, 4:339-353, (2008).
Bauer et al., The insect-trapping rim of Nepenthes pitchers: surface structure and function, Plant Signaling & Behavior, 4 (11): 1019-1023 (2009).
Beaugnon et al., Dynamics of magnetically levitated droplets. Physica B: Condensed Matter, 294-295:715-720 (2001).
Biance et al., Leidenfrost drops. Physics of Fluids, 15(6):1632-1637 (2003).
Bico et al., Pearl drops. Europhysics Letters, 47(2):220-226 (1999).
Blossey, R., Self-cleaning surfaces—Virtual realities. Nature Materials, 2(5):301-306 (2003).
Bohn et al., Insect aquaplaning: Nepenthes pitcher plants capture prey with the peristome, a fully wettable water-lubricated anisotropic surface, Proceedings of the National Academy of Sciences,14138-14143 (2004).
Burton, et al., Geometry of the Vapor Layer Under a Leidenfrost Drop. Physical Review Letters, 109(7):074301 (2012).
Cao et al., Anti-Icing Superhydrophobic Coatings, Langmuir Letter, 2009, A-E.
Cassie et al., Wettability of porous surfaces, Transactions of the Faraday Society, 40: 546-551, (1944).
Celestini, et al., Take Off of Small Leidenfrost Droplets. Physical Review Letters, 109(3):034501 (2012).
Chandra et al., Leidenfrost evaporation of liquid nitrogen droplets. Transactions—ASME: Journal of Heat Transfer, 116(4):999-1006 (1994).
Chandra et al., Observations of droplet impingement on a ceramic porous surface. International Journal of Heat and Mass Transfer 35(10):2377-2388 (1992).
Chen et al., A Wettability Switchable Surface by Microscale Surface Morphology Change, Journal of Micromechanics & Microengineering, Institute of Physics Publishing, 17(3): 489-195 (2007).
Cummings et al., Oscillations of magnetically levitated aspherical droplets. Journal of Fluid Mechanics, 224:395-416 (1991).
Deng et al., Nonwetting of impinging droplets on textured surfaces. Applied Physics Letters, 94(13) 133109 1-3 (2009).
Elbahri et al., Anti-lotus effect for nanostructuring at the leidenfrost temperature. Advanced Materials, 19(9):1262-1266 (2007).
Feng et al., Design and creation of superwetting/antiwetting surfaces. Advanced Materials, 18(23):3063-3078 (2006).
Fondecave, R. and Wyart, F.B., Polymers as Dewetting Agents, Marcomolecules 31:9305-9315 (1998).
Fujimoto et al., Deformation and rebounding processes of a water droplet impinging on a flat surface above Leidenfrost temperature. Journal of Fluids Engineering, Transactions of the ASME, 118(1):142-149 (1996).
Furmidge, Studies at Phase Interfaces, Journal of Colloid Science, 1962, 17: 309-324.
Gao et al., Artificial lotus leaf prepared using a 1945 patent and a commercial textile. Langmuir, 22(14):5998-6000 (2006).
Goldshtik et al., A liquid drop on an air cushion as an analogue of Leidenfrost boiling. Journal of Fluid Mechanics, 166:1-20 (1986).
Gradeck et al., Heat transfer for Leidenfrost drops bouncing onto a hot surface. Experimental Thermal and Fluid Science, 47:14-25 (2013).
Hashmi et al., Leidenfrost levitation: Beyond droplets. Scientific Reports, 2:797:1-4 (2012).
Hejazi et al., Wetting Transitions in Two-, Three-, and Four-Phase Systems, Langmuir, 28:2173-2180 (2012).
Holden et al., The Use of Organic Coatings to Promote Dropwise Condensation of Steam, Journal of Heat Transfer, 109: 768-774 (1987).
International Preliminary Report on Patentability, PCT/US2011/061498, Feb. 13, 2014, 12 pages.
International Search Report and Written Opinion for PCT/US2011/061498, dated Jul. 31, 2012, 17 pages.
International Search Report, PCT/US2011/061898, Apr. 24, 2013, 6 pages.

(56) References Cited

OTHER PUBLICATIONS

International Search Report, PCT/US2012/030370, Oct. 15, 2012, 6 pages.
International Search Report, PCT/US2012/042326, Dec. 3, 2012, 4 pages.
International Search Report, PCT/US2012/042327, May 16, 2013, 6 pages.
International Search Report, PCT/US2013/021558, Oct. 11, 2013, 5 pages.
International Search Report, PCT/US2013/028439, Dec. 5, 2013, 6 pages.
International Search Report, PCT/US2013/042771, May 26, 2014, 4 pages.
International Search Report, PCT/US2013/045731, Nov. 12, 2013, 3 pages.
International Search Report, PCT/US2013/070827, Mar. 27, 2014, 7 pages.
Iwasa, et al., 'Electromaglev'—Magnetic levitation of a superconducting disc with a DC field generated by electromagnets: Part 1. Theoretical and experimental results on operating modes, lift-to-weight ratio, and suspension stiffness. Cryogenics, 37(12):807-816, (1997).
Jung et al., Are Superhydrophobic Surfaces Best for Icephobicity? Langmuir, 27(6):3059-3066 (2011).
Kim et al., Hierarchical or not? Effect of the length scale and hierarchy of the surface roughness on omniphobicity of lubricant-infused substrates. Nano Letters, 13(4):1793-1799 (2013).
Kim et al., Levitation Time Measurement of Water Drops on the Surface of Liquid Nitrogen, Journal of the Korean Physical Society, vol. 58, No. 6, pp. 1628-1632 (Jun. 2011).
Kim, Heetae, Floating Phenomenon of a Water Drop on the Surface of Liquid Nitrogen, Journal of the Korean Physical Society, vol. 49, No. 4, pp. L1335-L1338 (Oct. 2006).
Kulinich et al., Ice Adhesion on Super-Hydrophobic Surfaces, Applied Surface Science, 2009, 225: 8153-8157.
Lafuma, A. et al., Slippery Pre-Suffused Surfaces; EPL, 96: 56001-p1-56001-p4 (2011).
Lagubeau et al., Leidenfrost on a ratchet. Nature Physics, 7(5):395-398 (2011).
Lee et al., Dynamic Wetting and Spreading Characteristics of a Liquid Droplet Impinging on Hydrophobic Textured Surfaces, Langmuir, (2011), 27, 6565-6573.
Leidenfrost, J. G., On the fixation of water in diverse fire. International Journal of Heat and Mass Transfer, 9(11):1153-1166 (1966).
Li et al., Dynamic Behavior of the Water Droplet Impact on a Textured Hydrophobic/Superhydrophobic Surface: The Effect of the Remaining Liquid Film Arising on the Pillars' Tops on the Contact Time, Langmuir, (2010), 26(7), 4831-4838.
Linke et al., Self-propelled leidenfrost droplets. Physical Review Letters, 96(15) (2006).
Liu et al., Metallic Surfaces with Special Wettability, Nanoscale, 3:825-238 (2011).
Marin et al., Capillary droplets on Leidenfrost micro-ratchets. arXiv preprint arXiv:1210.4978 (2012).
Meuler et al., Exploiting Topographical Texture to Impact Icephobicity, ACS Nano, 2010, 4(12): 7048-7052.
Mills, A. A., Pillow lavas and the Leidenfrost effect. Journal of the Geological Society, 141(1):183-186 (1984).
Mishchenko et al., Design of ice-free nanostructured surfaces based on repulsion of impacting water droplets. ACS Nano, 4(12):7699-7707 (2010).
Onda et al., Super-water-repellent fractal surfaces. Langmuir, 12(9) (1996).
Ou et al., Laminar drag reduction in microchannels using ultrahydrophobic surfaces. Physics of Fluids, 16(12):4635-4643 (2004).
Park et al., A Numerical Study of the Effects of Superhydrophobic Surface on Skin-Friction Drag in Turbulent Channel Flow, Phys. Fluids 25, 110815 (2013).

Piroird et al., Magnetic control of Leidenfrost drops. Physical Review E—Statistical, Nonlinear, and Soft Matter Physics, 85(5) (2012).
Pozzato et al., Superhydrophobic surfaces fabricated by nanoimprint lithography, Microelectronic Engineering, 83, (2006), 884-888.
Prat et al., On the effect of surface roughness on the vapor flow under Leidenfrost-Levitated droplets. Journal of Fluids Engineering, Transactions of the ASME, 117(3):519-525 (1995).
Quéré et al., Surfing the hot spot. Nature Materials, 5(6):429-430 (2006).
Quéré, D., Leidenfrost dynamics, Annu. Rev. Fluid Mech., 197-215 (2013).
Quéré, D., Non-sticking drops, Institute of Physics Publishing, Rep.Prog.Phys., 68(11):2495-2532 (2005).
Rausch et al., On the Characteristics of Ion Implanted Metallic Surfaces Inducing Dropwise Condensation of Steam, Langmuir, 26(8): 5971-5975 (2010).
Reyssat et al., Dynamical superhydrophobicity. Faraday Discussions, 146:19-33 (2010).
Reyssat, et al., Bouncing transitions on microtextured materials. Europhysics Letters, 74(2):306-312 (2006).
Richard, D. et al., Contact time of a bouncing drop, Nature 417:(6891):811 (2002).
Roosen et al., Optical levitation by means of two horizontal laser beams: a theoretical and experimental study. Physics Letters A, 59(1):6-8 (1976).
Rothstein, J. P., Slip on superhydrophobic surfaces, ANRV400-FL42-05, ARI, 89-109 (2010).
Rykaczewski et al., Mechanism of Frost Formation of Lubricant-Impregnated Surfaces, Langmuir 2013, 29 5230-5238, 13 pages.
Seiwert et al., Coating of a Textured Solid, J. Fluid Mech., 2011, 669: 55-63.
Sekeroglu et al., Transport of a soft cargo on a nanoscale ratchet. Applied Physics Letters, 99(6) (2011).
Smith et al., Droplet Mobility on Lubricant-Impregnated Surfaces, Soft Matter, 2012(9): 1772-1780 (2012).
Smith et al., Liquid-encapsulating surfaces: overcoming the limitations of superhydrophobic surfaces for robust non-wetting and anti-icing surfaces. In Bulletin of the American Physical Society (2011) Abstract Only.
Snoeijer et al., Maximum size of drops levitated by an air cushion. Physical Review E—Statistical, Nonlinear, and Soft Matter Physics, 79(3) (2009).
Song et al., Superhydrophobic Surfaces Produced by Applying a Self-Assembled Monolayer to Silicon Micro/Nano-Textured Surfaces, Nano Research, 2009, 2: 143-150.
Song et al., Vitrification and levitation of a liquid droplet on liquid nitrogen, PNAS Early Edition, pp. 1-5 (2010).
Trinh et al., the dynamics of ultrasonically levitated drops in an electric field. Physics of Fluids, 8(1):43-61 (1996).
Tuteja et al., Designing superoleophobic surfaces. Science, 318(5856):1618-1622 (2007).
Tuteja et al., Robust omniphobic surfaces. Proceedings of the National Academy of Sciences of the United States of America, 105(47):18200-18205 (2008).
Vakarelski et al., Drag reduction by leidenfrost vapor layers. Physical Review Letters, 106(21) (2011).
Vakarelski et al., Stabilization of Leidenfrost vapour layer by textured superhydrophobic surfaces. Nature, 489(7415):274-277 (2012).
Varanasi et al., Frost formation and ice adhesion on superhydrophobic surfaces. Applied Physics Letters, 97(23) (2010).
Varanasi et al., Spatial Control in the Heterogeneous Nucleation of Water, Applied Physics Letters, 95: 094101-01-03 (2009).
Weber et al., Aero-acoustic levitation: A method for containerless liquid-phase processing at high temperatures. Review of Scientific Instruments, 65(2):456-465 (1994).
Weickgenannt et al., Inverse-Leidenfrost phenomenon on nanofiber mats on hot surfaces. Physical Review E—Statistical, Nonlinear, and Soft Matter Physics, 84(3) (2011).
Weilert et al., Magnetic levitation and noncoalescence of liquid helium. Physical Review Letters, 77(23):4840-4843 (1996).

(56) References Cited

OTHER PUBLICATIONS

Welter et al., Acoustically levitated droplets—A new tool for micro and trace analysis. Fresenius' Journal of Analytical Chemistry, 357(3):345-350 (1997).
Wenzel, Resistance of Solid Surfaces to Wetting by Water, Industrial & Engineering Chemistry, 28(8): 988-994 (1936).
Wong et al., Bioinspired Self-Repairing Slippery Surfaces with Pressure-Stable Omniphobicity, Nature, 477(7365):443-447 (2011).
Written Opinion, PCT/US2011/061898, Apr. 24, 2013, 9 pages.
Written Opinion, PCT/US2012/030370, Oct. 15, 2012, 10 pages.
Written Opinion, PCT/US2012/042326, Dec. 3, 2012, 7 pages.
Written Opinion, PCT/US2012/042327, May 16, 2013, 6 pages.
Written Opinion, PCT/US2013/021558, Oct. 11, 2013, 7 pages.
Written Opinion, PCT/US2013/028439, Dec. 5, 2013, 11 pages.
Written Opinion, PCT/US2013/042771, May 26, 2014, 7 pages.
Written Opinion, PCT/US2013/045731, Nov. 12, 2013, 3 pages.
Written Opinion, PCT/US2013/070827, Mar. 27, 2014, 15 pages.
Würger, A., Leidenfrost gas ratchets driven by thermal creep. Physical Review Letters, 107(16) (2011).
Yarin et al., On the acoustic levitation of droplets. Journal of Fluid Mechanics, 356:65-91 (1998).
Yasuda et al., Levitation of metallic melt by using the simultaneous imposition of the alternating and the static magnetic fields. Journal of Crystal Growth, 260(3-4):475-485 (2004).
Yu et al., Containerless solidification of oxide material using an electrostatic levitation furnace in microgravity. Journal of Crystal Growth, 231(4):568-576 (2001).
Zhao et al., Dropwise condensation of Steam on Ion Implanted Condenser Surfaces, Heat Recovery Systems & CHP, 14(5): 525-534 (1994).
3M Corporation, Fluorinert Liquids for Electronics Manufacturing, 3M Electronic Materials 2003, pp. 1-4.
Bargir, S. et al., The use of contact angle measurements to estimate the adhesion propensity of calcium carbonate to solid substrates in water, Applied Surface Science 255:4873-4879 (2009).
Betz, A. R. et al., Do surfaces with mixed hydrophilic and hydrophobic areas enhance pool boiling?, Applied Physics Letters, 97:141909 p. 1-3, (2010).
Bird, J. C. et al, Reducing the contact time of a bouncing drop, Nature, 503:385 (2013).
International Search Report, PCT/US12/65627, Mar. 8, 2013, 3 pages.
Kazi et al., Mineral Scale Formation and Mitigation on Metals and a Polymeric Heat Exchanger Surface, Applied Thermal Engineering, 30:2236-2242 (2010).
Santos et al., Modified Stainless Steel Surfaces Targeted to Reduce Fouling, J. Food Engineering, 64:63-79 (2004).
Written Opinion, PCT/US12/65627, Mar. 8, 2013, 10 pages.
Marcus, Y., Ions in Water and Biophysical Implications from Chaos to Cosmos, Surfaces Between Water and Another Liquid, Springer, p. 147, Table 4.1 (2012).
International Search Report and Written Opinion for application PCT/US2014/066227 mailed Mar. 3, 2015.
International Preliminary Report on Patentability for application PCT/US2014/066227 mailed Feb. 2, 2016.
International Search Report and Written Opinion for application PCT/US2014/019532 mailed Nov. 25, 2014.
International Search Report and Written Opinion for application PCT/US2011/049187 mailed Jan. 23, 2013.
International Preliminary Report on Patentability for application PCT/US2011/049187 mailed Mar. 7, 2013.
[No Author Listed], Furaipan curabu (frying pan club). Nov. 21, 2011. Last accessed on Nov. 3, 2016 from <https://www.furaipan.com/kaigi/11/1121.shtml>. 3 pages.
[No Author Listed], How much is left in that container? Consumer reports. Sep. 2009. Last accessed on May 21, 2015 at <http://www.consumerreports.org/cro/magazine-archive/september-2009/personal-finance/good-to-the-last-drop/overview/good-to-the-last-drop-ov.htm?view=print>. 2 pages.
[No Author Listed], Liquiglide gets it all out. Packaging News. Mar. 30, 2015. Last accessed on May 21, 2015 at <http://www.packagingnews.com.au/news/liquiglide-gets-it-all-out>. 4 pages.
[No Author Listed], LiquiGlide Lets Food Slide Out of Packaging with Ease. Food Processing. 2014. Last accessed on May 21, 2015 at <http://www.foodprocessing.com/vendors/products/2014/liquiglide-lets-food-slide-out-of-packaging-with-ease>. 6 pages.
[No Author Listed], Liquiglide's Coatings Ensure Evacuation of Viscous Formulations. Beauty Packaging. Aug. 4, 2014. Last accessed on May 21, 2015 at <http://www.beautypackaging.com/issues/2014-08/view_design-center/liquiglides-coatings-ensure-evacuation-of-viscous-formulations/>. 1 page.
[No Author Listed], Scientists Develop Super-Slippery Material. Slashdot. Original Nov. 14, 2011 post with public comments. Last accessed on Nov. 3, 2016 from <https://science.slashdot.org/story/11/11/14/0437204/scientists-develop-super-slippery-material>. 11 pages.
[No Author Listed], Super Slippery surface processing Harvard University Development. Science SRAD. Original Nov. 17, 2011 post with public comments. Last accessed on Nov. 3, 2016 from <http://science.srad.jp/story/11/11/17/0037255/>. 8 pages.
[No Author Listed], What is fluid? Heishin Ltd. 2014. Last accessed on Nov. 3, 2016 from <http://www.mohno-pump.co.jp/learning/manabiya/c2b.html>. 2 pages.
Azimi et al., Hydrophobicity of rare-earth oxide ceramics. Nat Mater. Apr. 2013;12(4):315-20. doi: 10.1038/nmat3545. Epub Jan. 20, 2013.
Dickerson, Incredible new invention has solved a universally annoying problem. Business Insider. Mar. 23, 2015. Accessed on May 21, 2015 at <http://www.businessinsider.com/liquiglide-non-stick-coating-on-bottles-2015-3>. 4 pages.
Eck et al., Growth and thermal properties of ultrathin cerium oxide layers on RH(111). Surface Science. 2002;520:173-85.
Hirano, A study of Burning of Iron Fryingpan in Cooking. Journal of Home Economics of Japan. 1977;28(6):398-402.
King, MIT Bottle Coating Offers Promising Solution to Product Waste. Sustainable Brands. Jul. 9, 2012. Accessed on May 21, 2015 at <http://www.sustainablebrands.com/new_and_views/articles/mit-bottle-coating-offers-promising-solution-product-waste>. 2 pages.
Masubuchi, Interesting Rheology. Gijutsuhyoronsha. Jul. 25, 2010. pp. 104-106.
Matolin et al., Growth of ultra-thin cerium oxide layers on Cu(111). Surface Science. 2007;254:153-5.
Mullins et al., Ordered cerium oxide thin films grown on Ru(0001) and Ni(111). Surface Science. 1999;429:186-98.
Nosonovsky et al., Multiscale effects and capillary interactions in functional biomimetic surfaces for energy conversion and green engineering. Phil. Trans. R. Soc. A. 2009;367:1511-39.
Schierbaum et al., Ordered ultra-thin cerium oxide overlayers on Pt(111) single crystal surfaces studied by LEED and XPS. Surface Science. 1998;399:29-38.
Sutara et al., Epitaxial growth of continuous CeO2(111) ultra-thin films on Cu(111). Thin Solid Films 2008;516:6120-4.
Wong et al., Bioinspired Self-Repairing Slippery Surfaces with Pressure-Stable Omniphobicity. Nature. 2011;477(7365):443-7. Supplementary Information Included.
U.S. Appl. No. 15/200,923, filed Jul. 1, 2016, Dhiman et al.
U.S. Appl. No. 13/302,356, filed Nov. 22, 2011, Dhiman et al.
U.S. Appl. No. 13/495,931, filed Jun. 13, 2012, Anand et al.
U.S. Appl. No. 13/902,614, filed May 24, 2013, Smith et al.
U.S. Appl. No. 15/187,410, filed Jun. 20, 2016, Smith et al.
U.S. Appl. No. 14/194,110, filed Feb. 28, 2014, Bengaluru Subramanyam et al.
U.S. Appl. No. 14/084,126, filed Nov. 19, 2013, Smith et al.
U.S. Appl. No. 14/443,620, filed May 18, 2015, Smith et al.
PCT/US2014/066227, Mar. 3, 2015, International Search Report and Written Opinion.
PCT/US2014/066227, Feb. 2, 2016, International Preliminary Report on Patentability.
PCT/US2014/019532, filed Nov. 25, 2014, International Search Report and Written Opinion.

(56) References Cited

OTHER PUBLICATIONS

PCT/US2011/049187, filed Jan. 23, 2013, International Search Report and Written Opinion.
PCT/US2011/049187, filed Mar. 7, 2013, International Preliminary Report on Patentability.

| Adhesive Pressure(psi) | Mass flow rate (g/sec) | | Weight pre (g) | Weight post (g) |
|---|---|---|---|---|
| | coated | uncoated | coated | uncoated |
| 30 | 1.376 | 0.868 | 451.84 | 444.96 |
| 35 | 2.138 | 1.366 | 444.96 | 434.27 |
| 40 | 4.532 | 2.91 | 434.27 | 411.61 |

Adhesion strength calculations

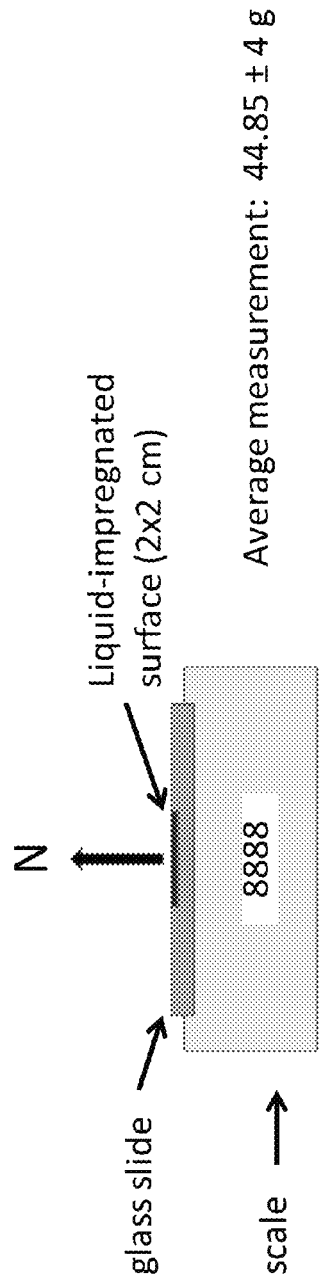

Average measurement: 44.85 ± 4 g $N = 4.4E\text{-}4 \pm 4E\text{-}5$ N
$A = 0.004$ m$^{-2}$ $$\tau_{adh} = \frac{N}{A}$$

$\tau_{adh} = \mathbf{1.1 \pm 0.1}$ Pa

The adhesion force was obtained by measuring the force needed to separate a liquid-impregnated surface from a glass slide in the normal direction. A glass slide was attached to the scale and the liquid-impregnated surface was pulled off of the surface in the normal direction. Capillarity forces due to the impregnated liquid resulted in adhesive strength of $\tau_{adh} = 1.1 \pm 0.1$ Pa.

Preparation of the liquid-impregnated surface: The surface was comprised of a lithography patterned array of square posts of 10 um width and height, and spaced by 25 um. 10 cSt silicone oil was impregnated into the surface.

FIG. 6

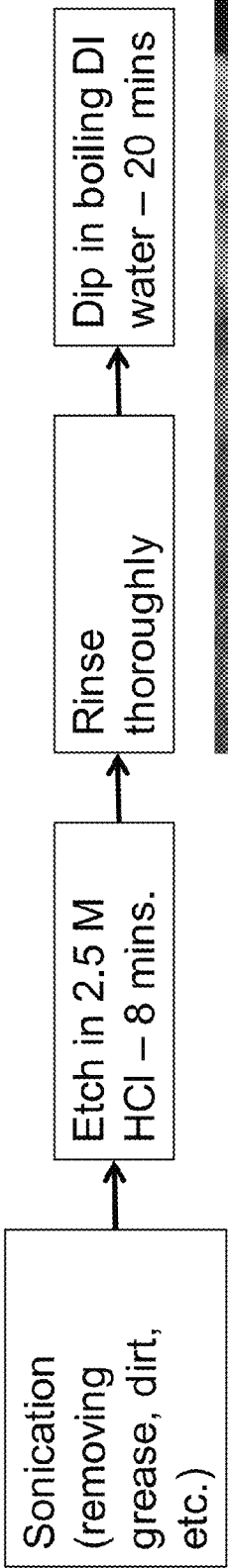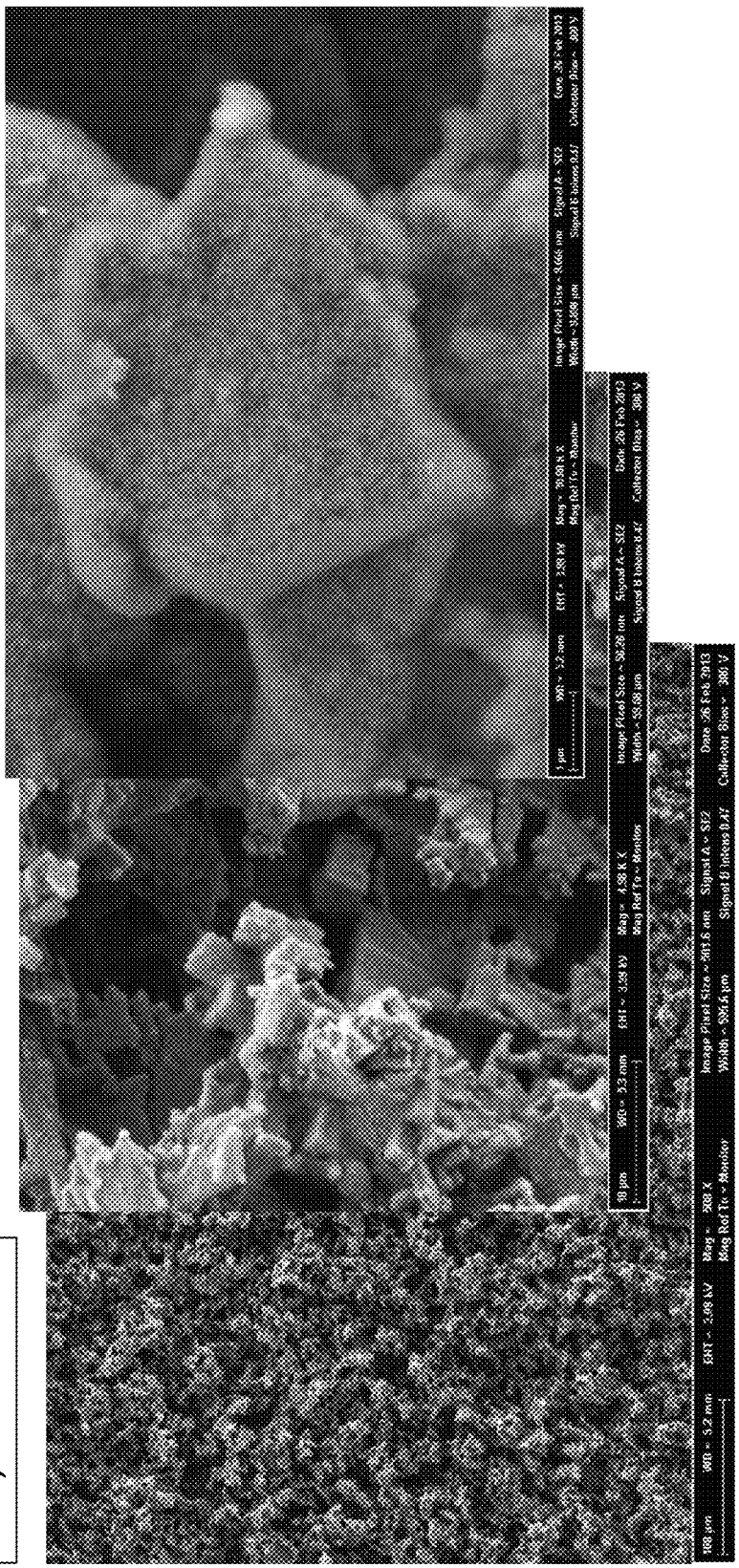
FIG. 8B

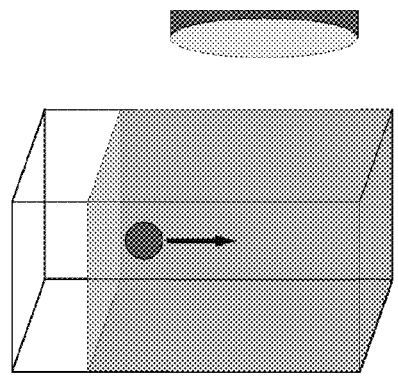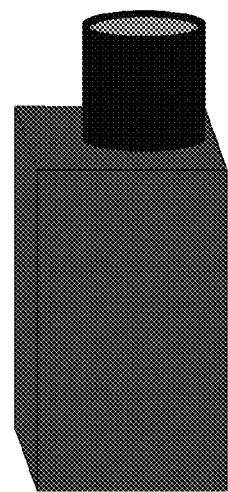
FIG. 8C

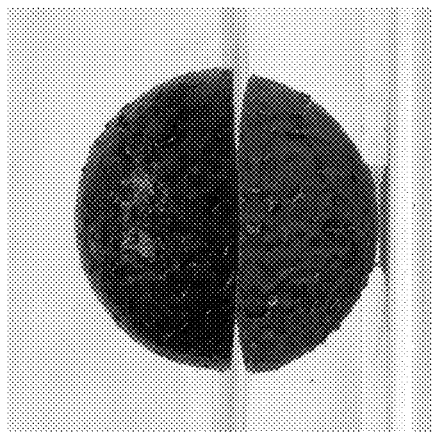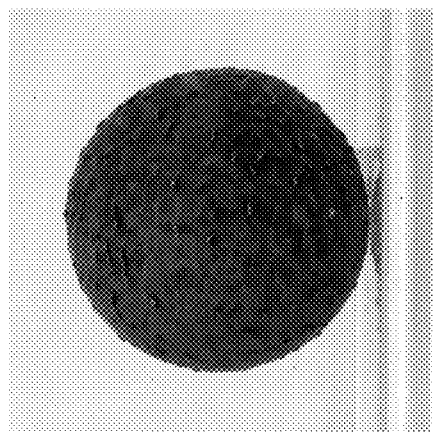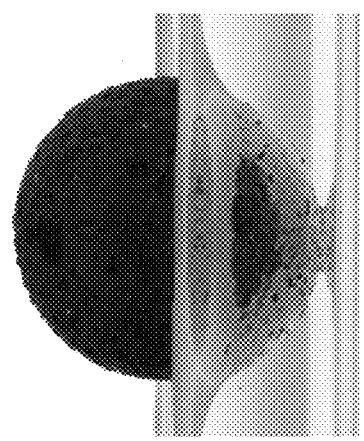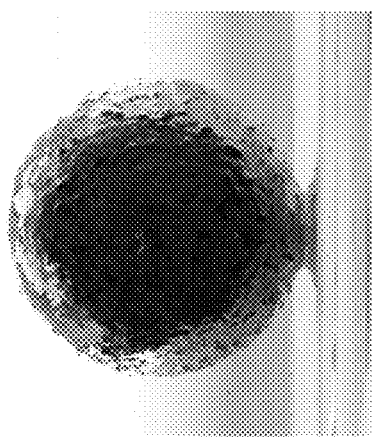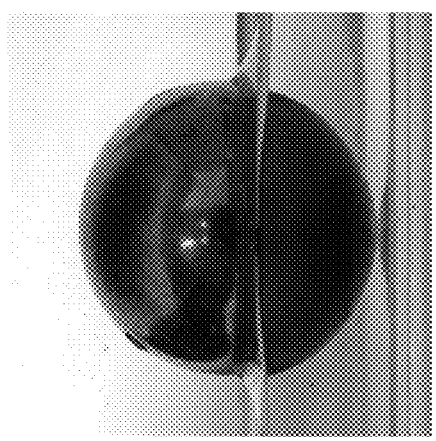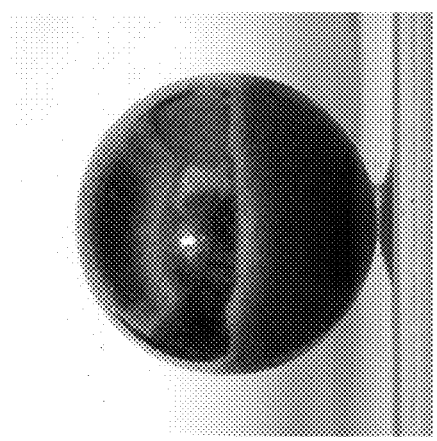
FIG. 9

APPARATUS WITH A LIQUID-IMPREGNATED SURFACE TO FACILITATE MATERIAL CONVEYANCE

RELATED APPLICATIONS

This application claims priority to and the benefit of, and incorporates herein by reference in its entirety, U.S. Provisional Patent Application No. 61/651,542, which was filed on May 24, 2012.

TECHNICAL FIELD

This invention relates generally to liquid-impregnated surfaces. More particularly, in certain embodiments, the invention relates to devices and implements with liquid-impregnated surfaces.

BACKGROUND

The advent of micro/nano-engineered surfaces in the last decade has opened up new techniques for enhancing a wide variety of physical phenomena in thermofluids sciences. For example, the use of micro/nano surface textures has provided nonwetting surfaces capable of achieving less viscous drag, reduced adhesion to ice and other materials, self-cleaning, and water repellency. These improvements result generally from diminished contact (i.e., less wetting) between the solid surfaces and adjacent liquids.

Liquid-impregnated surfaces are described in U.S. patent application Ser. No. 13/302,356, published as US 2013/0032316, entitled, "Liquid-Impregnated Surfaces, Methods of Making, and Devices Incorporating the Same," by Smith et al.; U.S. patent application Ser. No. 13/517,552, entitled, "Self-Lubricating Surfaces for Food Packaging and Food Processing Equipment," by Smith et al.; and U.S. Provisional Patent Application No. 61/827,444, filed May 24, 2013, entitled, "Apparatus and Methods Employing Liquid-Impregnated Surfaces," by Smith et al., the texts of which are incorporated herein by reference in their entireties.

There is a need for conduits (e.g., tubes, pipes, channels, vessels, etc.) having low resistance to flow, passage, or removal of material through, into, or out of the conduit.

SUMMARY OF THE INVENTION

Described herein are conduits for conveying fluids and/or solids, the conduits having an interior surface that provide a high-slip boundary condition, thereby facilitating the flow of material therethrough.

In one aspect, the invention provides conduit for conveying fluids and/or solids, the conduit having an interior surface comprising an impregnating liquid and a plurality of micro-scale and/or nano-scale solid features spaced sufficiently close to stably contain the impregnating liquid therebetween. In some implementations, the impregnating liquid fills spaces between the solid features. The interior surface may stably contain the impregnating liquid between the solid features. The impregnating liquid may be substantially held in place between the plurality of solid features regardless of orientation of the interior surface and regardless of flow, passage, or removal of fluids and/or solids through, into, or out of the conduit. The interior surface may be configured to provide a high-slip boundary condition at the interior surface, thereby facilitating the flow, passage, or removal of fluids and/or solids through, into, or out of the conduit.

In some implementations, the conduit is a tube, pipe, or channel. In some implementations, the conduit is a nozzle. In some implementations, the conduit is a mold (e.g., part of an injection molding apparatus) or is part of an extruder. In some implementations, the conduit is a canister or vessel.

In some implementations, the conduit comprises a reservoir for containing liquid for replenishing impregnating liquid lost from the liquid-impregnated surface. In some implementations, the device includes a conduit and a reservoir containing liquid for replenishing impregnating liquid lost from the liquid-impregnated surface.

In some implementations, the impregnating liquid includes at least one member selected from the group consisting of ethyl oleate, an ester, a fatty acid, a fatty acid derivative, a vegetable oil (e.g., olive oil, light olive oil, corn oil, soybean oil, rapeseed oil, linseed oil, grapeseed oil, flaxseed oil, canola oil, peanut oil, safflower oil, sunflower oil), phenyl isothiocyanate (phenyl mustard oil), a terpene, bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, amyl phthalate, silicone oil, a perfluorocarbon liquid, a perfluoroFluorinated vacuum oil (such as Krytox 1506 or Fromblin 06/6), a fluorinated coolant (e.g., perfluoro-tripentylamine sold as FC-70, manufactured by 3M), an ionic liquid, a fluorinated ionic liquid that is immiscible with water, a silicone oil comprising PDMS, a fluorinated silicone oil, a liquid metal, an electro-rheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, and a bodily fluid.

In some implementations, the solid features comprise one or more members selected from the group consisting of wax, carnauba wax, beeswax, candelilla wax, zein (from corn), dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, insoluble fiber, purified wood cellulose, micro-crystalline cellulose, kaolinite (clay mineral), Japan wax, pulp (e.g., spongy part of plant stems), ferric oxide, iron oxide, sodium formate, sodium oleate, sodium palmitate, sodium sulfate, silica, glass, a metal, a polymer (e.g., polytetrafluoroethylene, fluoroacrylate, fluoroeurathane, fluorosilicone, fluorosilane, modified carbonate, chlorosilanes, silicone, polydimethylsiloxane (PDMS)), a ceramic solid, a fluorinated solid, an intermetallic solid, a composite solid, PDMS, cyclic olefin polymer, polypropylene, PVC, PET, HDPE, polyimide, PMMA, glass, Perspex, Plexiglass, Polymacon, a hydrocarbon (e.g., an alkane, a fluoropolymer, teflon, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS), a ceramic (e.g., titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, fluorinated diamond-like carbon), an intermetallic compound (e.g., nickel aluminide and titanium aluminide), and a composite.

In some implementations, the solid features comprise particles having an average dimension in a rage of 1 micron to 50 microns (e.g., 5 microns to 50 microns). In some implementations, the particles are arranged with average spacing of about 1 microns to about 30 microns (e.g., 10 microns to 30 microns) between adjacent particles or clusters of particles. In some implementations, the particles are spray-deposited.

In some implementations, the solid features comprise or define at least one member selected from the group consisting of particles, amorphous particles, substantially spherical particles, posts, nanoneedles, microneedles, nanograss, micrograss, pores, cavities, wells, interconnected pores, interconnected cavities, grooves, and ridges.

In some implementations, the impregnating liquid comprises an additive to prevent or reduce evaporation of the impregnating liquid.

In another aspect of the invention, in some implementations, two parts are configured to come into contact with each other when the apparatus is in operation, wherein one of or each of the two parts includes a surface with an impregnating liquid and a plurality of micro-scale and/or nano-scale solid features spaced sufficiently close to stably contain the impregnating liquid therebetween. In some implementations, for each of the surfaces, the impregnating liquid fills spaces between the solid features and for each of the surfaces, the surface stably contains the impregnating liquid between the solid features. In some implementations, for each of said surfaces, the impregnating liquid is substantially held in place between the plurality of solid features regardless of orientation of the surfaces and regardless of contact made between the surfaces (e.g., where the apparatus is configured to cause adhesion normal to the surface; e.g., where the apparatus is configured to have low static coefficient of friction; or e.g., where the apparatus is configured to cause adhesion normal to the surface and have low static coefficient of friction). In some implementations, the apparatus is a bearing, a track, or a hinge.

In another aspect of the invention, in some implementations, the disclosed technology is used with an apparatus for capturing solid particulate from air or other gas. The apparatus includes a surface comprising an impregnating liquid and a plurality of micro-scale and/or nano-scale solid features spaced sufficiently close to stably contain the impregnating liquid therebetween. The impregnating liquid fills spaces between the solid features and the surface stably contains the impregnating liquid between the solid features. In some implementations, the impregnating liquid is substantially held in place between said plurality of solid features regardless of orientation of the surface.

In some implementations, the apparatus is an air filter.

The impregnating liquid may have a high viscosity (e.g., greater than 100 cP, or greater than 1000 cP).

In another aspect of the invention, in some implementations, the disclosed technology is used with an apparatus that includes a surface with a curable impregnating liquid and a plurality of micro-scale and/or nano-scale solid features spaced sufficiently close to stably contain the impregnating liquid therebetween, wherein the impregnating liquid fills spaces between said solid features and the surface stably contains the impregnating liquid between the solid features. In some implementations, the impregnating liquid is substantially held in place between the plurality of solid features regardless of orientation of the surface, and wherein the impregnating liquid can be converted to a solid by curing (e.g., exposure to heat).

In another aspect of the invention, in some implementations, the disclosed technology is used with an apparatus (e.g., airplane, boat, torpedo, etc.) that includes a surface configured for reduced drag and the surface includes an impregnating liquid and a plurality of micro-scale and/or nano-scale solid features spaced sufficiently close to stably contain the impregnating liquid therebetween. In some implementations, the impregnating liquid fills spaces between the solid features, wherein the surface stably contains the impregnating liquid between the solid features. In some implementations, the impregnating liquid is substantially held in place between the plurality of solid features regardless of orientation of the surface.

In some implementations, one or both of the following holds: (i) $0<\phi\leq0.25$, where $\phi$ is a representative fraction of the projected surface area of the liquid-impregnated surface corresponding to non-submerged solid at equilibrium; and (ii) $S_{ow(a)}<0$, where $S_{ow(a)}$ is spreading coefficient, defined as $\gamma_{wa}-\gamma_{wo}-\gamma_{oa}$, where $\gamma$ is the interfacial tension between the two phases designated by subscripts w, a, and o, where w is water, a is air, and o is the impregnating liquid. In some implementations, $0<\phi\leq0.25$. In some implementations, $0<\phi\leq0.10$. In some implementations, $0.01<\phi\leq0.25$. In some implementations, $0.01<\phi\leq0.10$. In some implementations, $S_{ow(a)}<0$.

In some implementations, one or both of the following holds: (i) $\theta_{os(w),receding}=0$; and (ii) $\theta_{os(a),receding}=0$ and $\theta_{os(w),receding}=0$, where $\theta_{os(w),receding}$ is receding contact angle of the impregnating liquid (e.g., oil, subscript 'o') on the surface (subscript 's') in the presence of water (subscript 'w'), and where $\theta_{os(a),receding}$ is receding contact angle of the impregnating liquid (e.g., oil, subscript 'o') on the surface (subscript 's') in the presence of air (subscript 'a').

BRIEF DESCRIPTION OF THE DRAWINGS

The objects and features of the invention can be better understood with reference to the drawing described below, and the claims.

FIG. 6 illustrates a solid-to-solid adhesion experiment for determining the adhesion strength of liquid-impregnated surfaces;

FIGS. 8A through 8D illustrate an experiment conducted to measure the drag on a metal sphere; and FIG. 9 illustrates the wetting behavior of a sphere with a liquid-impregnated surface, a sphere with a textured outer surface, an a sphere with a smooth surface.

DETAILED DESCRIPTION

Figure 1:
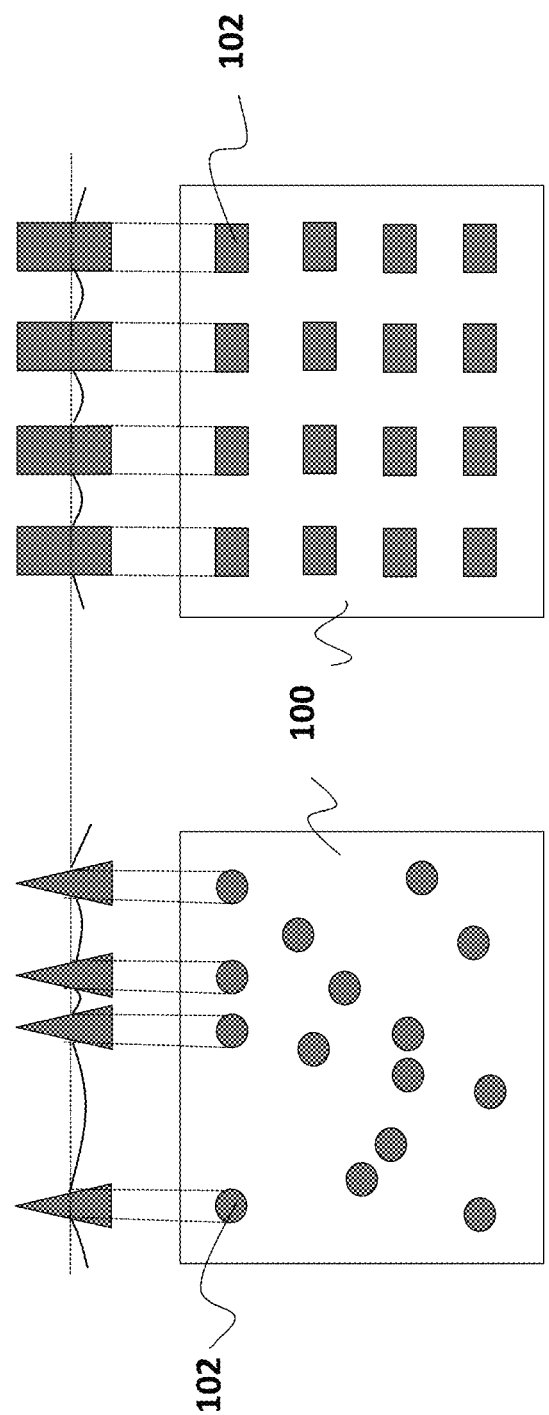
FIG. 1 illustrates a schematic cross-sectional and corresponding top view of a liquid-impregnated surface that are partially submerged.

It is contemplated that compositions, mixtures, systems, devices, methods, and processes of the claimed invention encompass variations and adaptations developed using information from the embodiments described herein. Adaptation and/or modification of the compositions, mixtures, systems, devices, methods, and processes described herein may be performed by those of ordinary skill in the relevant art.

Throughout the description, where articles, devices, apparatus and systems are described as having, including, or comprising specific components, or where processes and methods are described as having, including, or comprising specific steps, it is contemplated that, additionally, there are articles, devices, apparatus and systems of the present invention that consist essentially of, or consist of, the recited components, and that there are processes and methods according to the present invention that consist essentially of, or consist of, the recited processing steps.

Similarly, where articles, devices, mixtures, apparatus and compositions are described as having, including, or comprising specific compounds and/or materials, it is contemplated that, additionally, there are articles, devices, mixtures, apparatus and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Described herein are surfaces comprising an impregnating liquid and a plurality of micro-scale and/or nano-scale solid features spaced sufficiently close to stably contain the impregnating liquid therebetween, wherein the impregnating liquid fills spaces between the solid features, wherein the interior surface stably contains the impregnating liquid between the solid features, and wherein the impregnating liquid is substantially held in place between the plurality of solid features.

In certain embodiments, the solid features may be part of the surface itself (e.g., the surface may be etched or otherwise textured to create the solid features), or the solid features may be applied to the surface. In certain embodiments, the solid features include an intrinsically hydrophobic, oleophobic, and/or metallophobic material or coating. For example, the solid features may be made of: hydrocarbons, such as alkanes, and fluoropolymers, such as teflon, trichloro(1H,1H,2H,2H-perfluorooctyl)silane (TCS), octadecyltrichlorosilane (OTS), heptadecafluoro-1,1,2,2-tetrahydrodecyltrichlorosilane, fluoroPOSS, and/or other fluoropolymers. Additional possible materials include: ceramics, polymeric materials, fluorinated materials, intermetallic compounds, and composite materials. Polymeric materials may include, for example, polytetrafluoroethylene, fluoroacrylate, fluoroeurathane, fluorosilicone, fluorosilane, modified carbonate, chlorosilanes, silicone, polydimethylsiloxane (PDMS), and/or combinations thereof. Ceramics may include, for example, titanium carbide, titanium nitride, chromium nitride, boron nitride, chromium carbide, molybdenum carbide, titanium carbonitride, electroless nickel, zirconium nitride, fluorinated silicon dioxide, titanium dioxide, tantalum oxide, tantalum nitride, diamond-like carbon, fluorinated diamond-like carbon, and/or combinations thereof. Intermetallic compounds may include, for example, nickel aluminide, titanium aluminide, and/or combinations thereof.

The solid features of a liquid-impregnated surface may form physical textures or surface roughness. The textures may be random, including fractal, or patterned. In certain embodiments, the textures are micro-scale or nano-scale features. For example, the textures may have a length scale L (e.g., an average pore diameter, or an average protrusion height) that is less than about 100 microns, less than about 10 microns, less than about 1 micron, less than about 0.1 microns, or less than about 0.01 microns. In certain embodiments, the texture includes posts or other protrusions, such as spherical or hemispherical protrusions. Rounded protrusions may be preferable to avoid sharp solid edges and minimize pinning of liquid edges. The texture may be introduced to the surface using any conventional method, including mechanical and/or chemical methods.

In certain embodiments, the solid features include particles. In certain embodiments, the particles have an average characteristic dimension in a range, for example, of about 5 microns to about 500 microns, or about 5 microns to about 200 microns, or about 10 microns to about 50 microns. In certain embodiments, the characteristic dimension is a diameter (e.g., for roughly spherical particles), a length (e.g., for roughly rod-shaped particles), a thickness, a depth, or a height. In certain embodiments, the particles include insoluble fibers, purified wood cellulose, micro-crystalline cellulose, oat bran fiber, kaolinite (clay mineral), Japan wax (obtained from berries), pulp (spongy part of plant stems), ferric oxide, iron oxide, sodium formate, sodium oleate, sodium palmitate, sodium sulfate, wax, carnauba wax, beeswax, candelilla wax, zein (from corn), dextrin, cellulose ether, Hydroxyethyl cellulose, Hydroxypropyl cellulose (HPC), Hydroxyethyl methyl cellulose, Hydroxypropyl methyl cellulose (HPMC), and/or Ethyl hydroxyethyl cellulose. In certain embodiments, the particles include a wax. In certain embodiments, the particles are randomly spaced. In certain embodiments, the particles are arranged with average spacing of about 1 micron to about 500 microns, or from about 5 microns to about 200 microns, or from about 10 microns to about 30 microns between adjacent particles or clusters of particles. In certain embodiments, the particles are spray-deposited (e.g., deposited by aerosol or other spray mechanism).

In some embodiments, micro-scale features are used. In some embodiments, a micro-scale feature is a particle. Particles can be randomly or uniformly dispersed on a surface. Characteristic spacing between particles can be about 200 µm, about 100 µm, about 90 µm, about 80 µm, about 70 µm, about 60 µm, about 50 µm, about 40 µm, about 30 µm, about 20 µm, about 10 µm, about 5 µm or 1 µm. In some embodiments, characteristic spacing between particles is in a range of 100 µm to 1 µm, 50 µm to 20 µm, or 40 µm to 30 µm. In some embodiments, characteristic spacing between particles is in a range of 100 µm to 80 µm, 80 µm to 50 µm, 50 µm to 30 µm or 30 µm to 10 µm. In some embodiments, characteristic spacing between particles is in a range of any two values above.

Particles can have an average dimension of about 200 µm, about 100 µm, about 90 µm, about 80, about 70 µm, about 60 µm, about 50 µm, about 40 µm, about 30 µm, about 20 µm, about 10 µm, about 5 µm or 1 µm. In some embodiments, an average dimension of particles is in a range of 100

μm to 1 μm, 50 μm to 10 μm, or 30 μm to 20 μm. In some embodiments, an average dimension of particles is in a range of 100 μm to 80 μm, 80 μm to 50 μm, 50 μm to 30 μm, or 30 μm to 10 μm. In some embodiments, an average dimension of particles is in a range of any two values above.

In some embodiments, particles are porous. Characteristic pore size (e.g., pore widths or lengths) of particles can be about 5000 nm, about 3000 nm, about 2000 nm, about 1000 nm, about 500 nm, about 400 nm, about 300 nm, about 200 nm, about 100 nm, about 80 nm, about 50, about 10 nm. In some embodiments, characteristic pore size is in a range of 200 nm to 2 μm or 100 nm to 1 μm. In some embodiments, characteristic pore size is in a range of any two values above.

The impregnating liquid of a liquid-impregnating surface may be oil-based or water-based (i.e., aqueous). The liquid may be chosen for a given application based on its properties. In certain embodiments, the impregnating liquid is an ionic liquid (e.g., BMI-IM). Other examples of possible impregnating liquids include hexadecane, vacuum pump oils (e.g., FOMBLIN® 06/6, KRYTOX® 1506) silicon oils (e.g., 10 cSt or 1000 cSt), fluorocarbons (e.g., perfluorotripentylamine, FC-70), shear-thinning fluids, shear-thickening fluids, liquid polymers, dissolved polymers, viscoelastic fluids, and/or liquid fluoroPOSS. In one embodiment, the impregnating liquid is made shear thickening with the introduction of nano particles. A shear-thickening impregnating liquid may be desirable for preventing impalement and resisting impact from impinging liquids, for example. To minimize evaporation of the impregnating liquid from the surface, it may be desirable to use an impregnating liquid that has a low vapor pressure (e.g., less than 0.1 mmHg, less than 0.001 mmHg, less than 0.00001 mmHg, or less than 0.000001 mmHg). In certain embodiments, the impregnating liquid has a freezing point of less than −20° C., less than −40° C., or about −60° C. In certain embodiments, the surface tension of the impregnating liquid is about 15 mN/m, about 20 mN/m, or about 40 mN/m. In certain embodiments, the viscosity of the impregnating liquid is from about 10 cSt to about 1000 cSt.

The impregnating liquid may be introduced to the surface using a conventional technique for applying a liquid to a solid. In certain embodiments, a coating process, such as a dip coating, blade coating, or roller coating, is used to apply the impregnating liquid. Alternatively, the impregnating liquid may be introduced and/or replenished by liquid materials flowing past the surface. In preferred embodiments, after the impregnating liquid has been applied, capillary forces hold the liquid in place.

In certain embodiments, a texture may be applied to a substrate to form a surface with solid features. Applying the texture may include: exposing the substrate to a solvent (e.g., solvent-induced crystallization), extruding or blow-molding a mixture of materials, roughening the substrate with mechanical action (e.g., tumbling with an abrasive), spray-coating, polymer spinning, depositing particles from solution (e.g., layer-by-layer deposition and/or evaporating away liquid from a liquid and particle suspension), extruding or blow-molding a foam or foam-forming material (e.g., a polyurethane foam), depositing a polymer from a solution, extruding or blow-molding a material that expands upon cooling to leave a wrinkled or textured surface, applying a layer of material onto a surface that is under tension or compression, performing non-solvent induced phase separation of a polymer to obtain a porous structure, performing micro-contact printing, performing laser rastering, performing nucleation of the solid texture out of vapor (e.g., desublimation), performing anodization, milling, machining, knurling, e-beam milling, performing thermal or chemical oxidation, and/or performing chemical vapor deposition. In certain embodiments, applying the texture to the substrate includes spraying a mixture of edible particles onto the substrate. In certain embodiments, impregnating the matrix of features with the liquid includes: spraying the encapsulating liquid onto the matrix of features, brushing the liquid onto the matrix of features, submerging the matrix of features in the liquid, spinning the matrix of features, condensing the liquid onto the matrix of features, depositing a solution comprising the liquid and one or more volatile liquids, and/or spreading the liquid over the surface with a second immiscible liquid. In certain embodiments, the liquid is mixed with a solvent and then sprayed, because the solvent will reduce the liquid viscosity, allowing it to spray more easily and more uniformly. Then, the solvent will dry out of the coating. In certain embodiments, the method further includes chemically modifying the substrate prior to applying the texture to the substrate and/or chemically modifying the solid features of the texture. For example, the method may include chemically modifying with a material having contact angle with water of greater than 70 degrees (e.g., hydrophobic material). The modification may be conducted, for example, after the texture is applied, or may be applied to particles prior to their application to the substrate. In certain embodiments, impregnating the matrix of features includes removing excess liquid from the matrix of features. In certain embodiments, removing the excess liquid includes: using a second immiscible liquid to carry away the excess liquid, using mechanical action to remove the excess liquid, absorbing the excess liquid using a porous material, and/or draining the excess liquid off of the matrix of features using gravity or centrifugal forces.

Liquid-impregnated surfaces are useful for reducing viscous drag between a solid surface and a flowing liquid. In general, the viscous drag or shear stress exerted by a liquid flowing over a solid surface is proportional to the viscosity of the liquid and the shear rate adjacent to the surface. A traditional assumption is that liquid molecules in contact with the solid surface stick to the surface, in a so-called "no-slip" boundary condition. While some slippage may occur between the liquid and the surface, the no-slip boundary condition is a useful assumption for most applications. In certain embodiments, liquid-impregnated surfaces are desirable as they induce a large amount of slip at the solid surface. Drag reductions of as much as 40% may be achieved due to this slippage.

In certain embodiments, impregnating a liquid within the textures of a liquid-impregnated surface prevents or reduces nucleation in these regions. The reduction in nucleation is enhanced where liquid covers the tops of the solid features of the liquid-impregnated surface. Furthermore, in certain embodiments, liquid-impregnated surfaces have low roll-off angles (i.e., the angle or slope of a surface at which a droplet in contact with the surface will begin to roll or slide off the surface). The low roll-off angles associated with liquid-impregnated surfaces allow droplets in contact with the surface to easily roll off the surface before the liquid can accumulate on the surface. In certain embodiments, liquid-impregnated surfaces are used to provide hydrate-phobicity, thereby preventing or minimizing the formation of hydrates. In certain embodiments, liquid-impregnated surfaces are used to provide salt-phobicity, thereby preventing or minimizing the formation of salts or mineral scale.

In certain embodiments, liquid-impregnated surfaces are used to reduce viscous drag between a solid surface and a flowing liquid. In certain embodiments, a liquid-impregnated surface is used to provide lubrication between the liquid-impregnated surface and a substance in contact with the surface (or the surface itself, where one liquid-impregnated surface rubs against another liquid-impregnated surface, or parts of the liquid-impregnated surface rub against each other). For example, liquid-impregnated surfaces may provide significant slip/lubrication advantages when in contact with a substance that is a non-Newtonian material, a Bingham plastic, a thixotropic fluid, and/or a shear-thickening substance.

Liquid-impregnated surfaces may also provide anti-fouling and/or self-cleaning Liquid-impregnated surfaces may also be used to promote the condensation of moisture.

As used herein, emerged area fraction $\phi$ is defined as a representative fraction of the projected surface area of (a representative fraction of) the liquid-impregnated surface corresponding to non-submerged solid at equilibrium (or pseudo-equilibrium). The term "equilibrium" as used herein refers to the condition in which the average thickness of the impregnating film does not substantially change over time due to drainage by gravity when the substrate is held away from horizontal, and where evaporation is negligible (e.g., if the liquid impregnated liquid were to be placed in an environment saturated with the vapor of that impregnated liquid). Similarly, the term "pseudo-equilibrium" as used herein refers to the same condition except that evaporation may occur.

In general, a "representative fraction" of a surface refers to a portion of the surface with a sufficient number of solid features thereupon such that the portion is reasonably representative of the whole surface. In certain embodiments, a "representative fraction" is at least a tenth of the whole surface.

In certain embodiments, $\phi$ is zero (there is a layer of liquid over the top of the solid features which may be, for example, at least 1 nm, at least 5 nm, at least 10 nm, or at least 100 nm in thickness). In certain embodiments of the present invention, $\phi$ is less than 0.30, 0.25, 0.20, 0.15, 0.10, 0.05, 0.01, or 0.005. In certain embodiments, $\phi$ is greater than 0.001, 0.005, 0.01, 0.05, 0.10, 0.15, or 0.20. In certain embodiments, $\phi$ is in a range of about 0 and about 0.25. In certain embodiments, $\phi$ is in a range of about 0 and about 0.01. In certain embodiments, $\phi$ is in a range of about 0.001 and about 0.25. In certain embodiments, $\phi$ is in a range of about 0.001 and about 0.10.

In some embodiments, the liquid-impregnated surface is configured such that cloaking by the impregnating liquid can be either eliminated or induced, according to different embodiments described herein.

As used herein, the spreading coefficient, $S_{ow(a)}$ is defined as $\gamma_{wa}-\gamma_{wo}-\gamma_{oa}$, where $\gamma$ is the interfacial tension between the two phases designated by subscripts w, a, and o, where w is water, a is air, and o is the impregnating liquid. Interfacial tension can be measured using a pendant drop method as described in Stauffer, C. E., "The measurement of surface tension by the pendant drop technique," *J. Phys. Chem.* 1965, 69, 1933-1938, the text of which is incorporated by reference herein. Exemplary surfaces and its interfacial tension measurements (at approximately 25° C.) are shown in Appendix D, in particular, Table S2.

Without wishing to be bound to any particular theory, impregnating liquids that have $S_{ow(a)}$ less than 0 will not cloak, resulting in no loss of impregnating liquids, whereas impregnating liquids that have $S_{ow(a)}$ greater than 0 will cloak matter (condensed water droplets, bacterial colonies, solid surface) and this may be exploited to prevent corrosion, fouling, etc. In certain embodiments, cloaking is used for preventing vapor-liquid transformation (e.g, water vapor, metallic vapor, etc.). In certain embodiments, cloaking is used for inhibiting liquid-solid formation (e.g., ice, metal, etc.). In certain embodiments, cloaking is used to make reservoirs for carrying the materials, such that independent cloaked materials can be controlled and directed by external means (like electric or magnetic fields).

In certain embodiments, lubricant cloaking is desirable and is used a means for preventing environmental contamination, like a time capsule preserving the contents of the cloaked material. Cloaking can result in encasing of the material thereby cutting its access from the environment. This can be used for transporting materials (such as bioassays) across a length in a way that the material is not contaminated by the environment.

In certain embodiments, the amount of cloaking can be controlled by various lubricant properties such as viscosity, surface tension. Additionally or alternatively, we can control the de-wetting of the cloaked material to release the material. Thus, it is contemplated that a system in which a liquid is dispensed in the lubricating medium at one end, and upon reaching the other end is exposed to environment that causes the lubricant to uncloak.

In some embodiments, an impregnating liquid can be selected to have a $S_{ow(a)}$ less than 0. Exemplary impregnating liquids include, but are not limited to, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl)imide (BMIm), tribromohydrin(1,2,3-tribromopropane), tetradecane, cyclohexane, ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, amyl phthalate and any combination thereof.

Referring to FIG. 1, a schematic cross-sectional view and the corresponding top view of a liquid-impregnated surface that is partially submerged is shown. The upper left drawing of FIG. 1 shows a cross-sectional view of a row of cone-shaped solid features. The projected surface area of the non-submerged solid 102 is illustrated as shaded areas of the overhead view, while the remaining non-shaded area represents the projected surface area of the submerged liquid-impregnated surface 100. In addition to the projection surface area of this row of solid features, other solid features placed in a semi-random pattern are shown in shade in the overhead view. Similarly, the cross-section view of a row of evenly spaced posts is shown on the right of FIG. 1. Additional rows of well-patterned posts are shown in shade in the overhead view. As demonstrated, in some embodiments of the present invention, a liquid-impregnated surface includes randomly and/or non-randomly patterned solid features.

In certain embodiments, a material exhibits the nucleation show in FIG. 1 on its surface. The material's surface comprises an array of micro-scale or nano-scale solid features spaced sufficiently close to contain an impregnating liquid in between them. The impregnating liquid fills the spaces between the solid features, and the surface stably holds the impregnating liquid in place in between the solid features regardless of the orientation of the surface. In some implementations, the particles have an average dimension of 5 microns to 50 microns. In some implementations, the particles are arranged with average spacing of about 10 microns to about 30 microns between adjacent particles or clusters of particles.

In certain embodiments, the particles are coated onto the material's surface by spray coating the surface with an impregnating liquid solution. The spray coating may apply a uniform coat of impregnating liquid to the surface of the material. In certain implementations, the impregnating liquid may be spray coated onto the surface of the material in multiple stages. In certain implementations where the impregnating solution is composed of several different solutions, the various constituent solutions of the impregnating liquid may be spray coated onto the target surface in different stages.

The applications of liquid-impregnated surfaces could extend, for example, to a conduit for conveying fluids and/or solids. The conduit may have an interior surface comprising an impregnating liquid and micro-scale and/or nano-scale solid features spaced sufficiently close to stably contain the impregnating liquid therebetween. The impregnating liquid may fill spaces between the solid features. In some implementations, the interior surface stably contains the impregnating liquid between the solid features. The impregnating liquid may be substantially held in place between the of solid features regardless of orientation of the interior surface and regardless of flow, passage, or removal of fluids and/or solids through, into, or out of the conduit. The interior surface may be configured to provide a high-slip boundary condition at the interior surface, thereby facilitating the flow, passage, or removal of fluids and/or solids through, into, or out of the conduit.

In some implementations, the conduit includes a reservoir for containing liquid for replenishing impregnating liquid lost from the liquid-impregnated surface. The reservoir may provide a continuous supplying liquid-impregnated surface solution back to the desired surface. in some implementations, the reservoir is used to replenish impregnating liquid lost from the liquid-impregnated surface.

In some implementations, the impregnating liquid is an ethyl oleate, a fatty acid, a vegetable oil (e.g., olive oil, light olive oil, corn oil, soybean oil, rapeseed oil, linseed oil, grapeseed oil, flaxseed oil, canola oil, peanut oil, safflower oil, sunflower oil), tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl)imide (BMIm), tribromohydrin(1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, and/or amyl phthalate. The impregnating liquid may include an additive to prevent or reduce evaporation of the impregnating liquid.

In some implementations, the solid features include wax, carnauba wax, beeswax, candelilla wax, zein (from corn), dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, insoluble fiber, purified wood cellulose, micro-crystalline cellulose, kaolinite (clay mineral), Japan wax, pulp (e.g., spongy part of plant stems), ferric oxide, iron oxide, sodium formate, sodium oleate, sodium palmitate, sodium sulfate, a metal, a polymer, a ceramic solid, a fluorinated solid, an intermetallic solid, and/or a composite solid.

The solid features may include particles having an average dimension in a rage of 5 microns to 50 microns. The particles may be arranged with average spacing of about 10 microns to about 30 microns between adjacent particles or clusters of particles. The particles may be spray-deposited.

The solid features may include particles, amorphous particles, substantially spherical particles, posts, nanoneedles, microneedles, nanograss, micrograss, pores, cavities, wells, interconnected pores, and/or interconnected cavities.

The applications of liquid-impregnated surfaces could extend, for example, to an apparatus with two parts configured to come into contact with each other when the apparatus is in operation. Each of the two parts may include a surface comprising an impregnating liquid and micro-scale and/or nano-scale solid features spaced sufficiently close to stably contain the impregnating liquid therebetween. For each of the surfaces, the impregnating liquid fills spaces between said solid features. Each surface may stably contain the impregnating liquid between the solid features. For each of the surfaces, the impregnating liquid is substantially held in place between the solid features regardless of orientation of the surfaces and regardless of contact made between the surfaces. In some implementations, the apparatus is a thrust bearing.

In some implementations, the disclosed technology includes an apparatus for capturing solid particulate from air or other gas. The apparatus may include a surface with an impregnating liquid and a micro-scale and/or nano-scale solid features spaced sufficiently close to stably contain the impregnating liquid therebetween. The impregnating liquid may fill spaces between the solid features. The surface may stably contain the impregnating liquid between the solid features. The impregnating liquid may be substantially held in place between the solid features regardless of orientation of the surface. in some implementations, the apparatus is an air filter. The impregnating liquid has high viscosity (e.g., greater than 1000 cP).

The disclosed technology, in some implementations, may include a surface with a curable impregnating liquid and micro-scale and/or nano-scale solid features spaced sufficiently close to stably contain the impregnating liquid therebetween. The impregnating liquid may fill spaces between the solid features. The surface may stably contain the impregnating liquid between the solid features. The impregnating liquid may be substantially held in place between the solid features regardless of orientation of the surface. The impregnating liquid may be converted to a solid by curing (e.g., exposure to heat).

The applications of liquid-impregnated surfaces could extend, for example, to an apparatus (e.g., vehicle, automobile, airplane, boat, torpedo, missile, etc.) with a surface configured for reduced drag. The surface may include an impregnating liquid and micro-scale and/or nano-scale solid features spaced sufficiently close to stably contain the impregnating liquid therebetween. The impregnating liquid may fill spaces between the solid features. The surface may stably contain the impregnating liquid between the solid features. The impregnating liquid may be substantially held in place between the solid features regardless of orientation of the surface.

The applications of liquid-impregnated surfaces could extend, for example, to in fluid conveyances and manufacturing equipment, systems, and processes, such as those described below. In some implementations, liquid-impregnated surfaces are used for pumping, packing, moving, and/or transferring fluids/materials. In some implementations, liquid-impregnated surfaces may be used to transfer fluids between containers. Liquid-impregnated surfaces may be used to convey viscous materials such as cement, oil, polymers, chocolate, cat food, dog food, waxes, and/or heavy oils in the oil and gas industry.

In some implementations, the no-slip condition between the conduit and the material being conveyed results in a velocity profile that is very steep at the edge of the conduit. For some processes, this is very undesirable since the high shear may actually degrade the material or product. The disclosed technology, in some implementations, provides a high-slip boundary condition so that the material moves, for example, as a slug, with a very uniform velocity profile. This is beneficial in applications with a very viscous material, and also with a low-viscosity material flowing in a small conduit, such as an IV drip.

In some embodiments, the liquid-impregnated surface coating may be applied to IV drips, the lining of IV tubes and the interior surfaces of IV bags. Such a coating would allow the content of an IV bag and/or tube to easily slide along the IV bag and tube with minimal waste of the content. By increasing the slipperiness of the IV lining, the liquid-impregnated surface coating reduces the attractive forces between the IV tubes and bags and their contents. This allows the content to be easily dispensed. For example, medical practitioners are frequently unable to convey an adequate flow rate of drugs to the patient because they cannot afford to put in a larger-gauge IV. Creation of a liquid-impregnated surface in the IV tube provides medical practitioners with the ability to convey an adequate flow rate of drugs to a patient without using a larger-gauge IV.

The applications of liquid-impregnated surfaces may, for example, be used for molding. For example, liquid-impregnated surfaces may be used in transfer molding. In some implementations, this includes a method for altering any existing surface to be a textured surface. In some implementations, a textured surface is filled with an uncured liquid polymer (for example). The filled surface (which is the mold) may be placed onto the existing surface so that the liquid polymer comes in contact with the existing surface. The liquid polymer may then be cured and hardened (which can be accomplished by a variety of processes dependent on the liquid polymer used). After hardening, the mold may be removed leaving textured cured polymer on the surface. In some implementations, the original textured surface (e.g., the mold) could be filled with a mixtures of nano or microscale particles and liquid (e.g., a slurry). Liquid-impregnated surfaces may also be used as a mold release agent.

The applications of liquid-impregnated surfaces may, for example, be used on bearings. For example, a thrust bearing could be comprised of two liquid encapsulated surfaces each with a different fluid that are immiscible. When the surfaces come in contact, the interface will be liquid-liquid. The resulting friction will be very low. A shear thinning fluid may be used to reach even lower frictions or to custom-tailor the resistance to vary.

The applications of liquid-impregnated surfaces may be used, for example, with high-friction manufacturing processes, containers, and associated equipment. For example, liquid-impregnated surfaces may be used for injection molding. Typically the high shear forces encountered in injection molding lead to viscous heating within the polymer melt, and in extreme cases may result in burning of the polymer. Application of a liquid-impregnated surface coating to mold runners and cavities will substantially reduce the shear forces at the wall, leading to lower injection pressures. This provides several benefits include reducing the energy requirements for injection, but it means that the same part may be molded on a smaller, less-expensive injection molding machine. In some implementations, the coating could simultaneously function as a mold release agent. In some implementations, power required to extrude from nozzles can be significantly reduced if the nozzle is coated with a liquid-impregnated surface. Liquid-impregnated surfaces may be used to create a lubricated die or extruder part that will not oxidize. Liquid-impregnated surfaces may also be used to lubricate the die.

Liquid-impregnated surfaces may be used for extrusion and/or forging. Extrusion and forging both typically involve the flow of a highly viscous material past a die surface, with a small amount of relative slip (as opposed to the large amount of relative slip in a conduit like a pipe). This includes extrusion and/or forging of plastics, metals, food products such as gum and candy, wire, glue, epoxy, rubber, and/or polymers. Liquid-impregnated surfaces may be used in cold extrusion and/or cold forging.

Liquid-impregnated surfaces may be used in container containing liquid metals, lubricants, caulk, cement, tiling grit, plaster, tar, asphalt, coal slurry, wax, laundry detergent, dishwashing detergent, grease containers, refrigerant containers, butane containers, liquid nitrogen container, liquid helium containers, gas containers, liquified gas container motor oil containers, petroleum product, brake fluid containers, oil containers, paint, inks, construction materials (e.g., intumescent), or other materials and/or containers. Liquid-impregnated surfaces may be used to create self-cleaning glass, photovoltaic cells, and/or solar thermal. Liquid-impregnated surfaces may also be used in association with desalination (e.g., condensers used in desalination), liquid natural gas condensers, energy conservation (e.g., condensers in power plants, oil pipelines, fuel lines. Liquid-impregnated surfaces may also be used to create de-icing surfaces on cars, airplanes, buses, and other vehicles and/or equipment. Liquid-impregnated surfaces may also be used for solid-to-solid friction reduction by applying creating a liquid-impregnated surface to one or both surfaces.

Liquid-impregnated surfaces may also be used in lab materials. For example, liquid-impregnated surfaces may be used in pipettes, beakers, and other materials. Liquid-impregnated surfaces may also be used in air filtration. For example, an air filter may use a replacement cartridge comprising liquid-impregnated surfaces (e.g., a weaving path of liquid-impregnated surfaces). The air filter cartridge may be incorporated into a device that moves air from the surrounding environment through the cartridge to filter the air. Dust passed through the air filter will, in some implementations, stick to the liquid-impregnated surfaces in the cartridge.

Liquid-impregnated surfaces for slug traps, insect traps, and/or pest traps. For example, liquid-impregnated surfaces may be used for capturing bugs. Encapsulated surfaces can produce a large normal force, insects landing on the surface will not be able to generate enough force to remove themselves. An encapsulated surface would have a similar effect and be extremely "sticky" for small insects. Liquid-impregnated surfaces may also be used as a pesticide by creating a surface that bugs cannot land on.

Liquid-impregnated surfaces may be used in adhesive strips. In some implementations, a liquid-impregnated surface has strong capillary adhesive forces in the normal direction (pulling the surfaces apart) resulting from the surface tension of the impregnating liquid pulling downward against the solid objects, normal to the surface. In some implementations, the textured surface may be encapsulated with liquid that can solidify or cure (for example an epoxy). Thus a curable liquid encapsulated surface could be as convenient to apply as a conventional tape, but have the strength of epoxy.

Liquid-impregnated surfaces may be used for display preservation. For example, a user can write/print/draw on a properly textured surface. After the surface is coated in an oil, the writing is effectively locked in and protected.

Liquid-impregnated surfaces may also be used on windshields of planes, trains, or automobiles, or similarly on helmet visors and/or glasses (e.g., sunglasses). For example, cleaning windshields in rain with wipers requires significant amount of energy. Liquid-encapsulated windshields can potentially repel rain drops without the need for wipers. Similarly, liquid-impregnated surfaces may be applied to airplane windshields as well. A liquid-impregnated surface may be applied to the windshield or may be sprayed from a reservoir onto the windshield when necessary (e.g., during an airplane landing, during a rainstorm, etc.).

Liquid-impregnated surfaces may also be used on skis, ice skates, sleds, swimsuits, boats, or other water and/or sporting equipment. Liquid-impregnated surfaces could also be used on the surface of torpedoes.

Liquid-impregnated surfaces may also be used in tractors for farming, CO2 condensers, LP condenser, N2 condensers, surfaces for condensation of gases and/or on the interior of hydraulic lines and gas lines.

Liquid-impregnated surfaces may be used on household appliances, accessories, and items such as pans, cookware, eating utensils, spatulas, pots, plates, drains, and/or toilet bowls. Liquid-impregnated surfaces may be applied to a portion of a surface to corral liquids. Liquid impregnated surfaces may be used on toys and games. For example, liquid-impregnated surfaces may be used on a slip n slide.

Experimental Examples

Example 1

FIGS. 2A-F demonstrate the effect of liquid-impregnated surfaces on tubes, pipes, channels, or other similar items. A PVC pipe was cut into one foot sections. A carnauba wax coating (carnauba wax suspended in trichloroethylene, 5% wt.) was sprayed into both ends of the pipe for 5-20 seconds to apply a uniform coating to the inside of the pipe. N2 was blown across and within the pipe to allow coating to dry (~1-2 minutes). Next, ethyl oleate was sprayed into both ends of the pipe for 5-20 seconds until the pipe becomes transparent again (which indicates the texture is fully impregnated). The resulting product was a pipe with a liquid-impregnated inner surface.

Figure 2A:
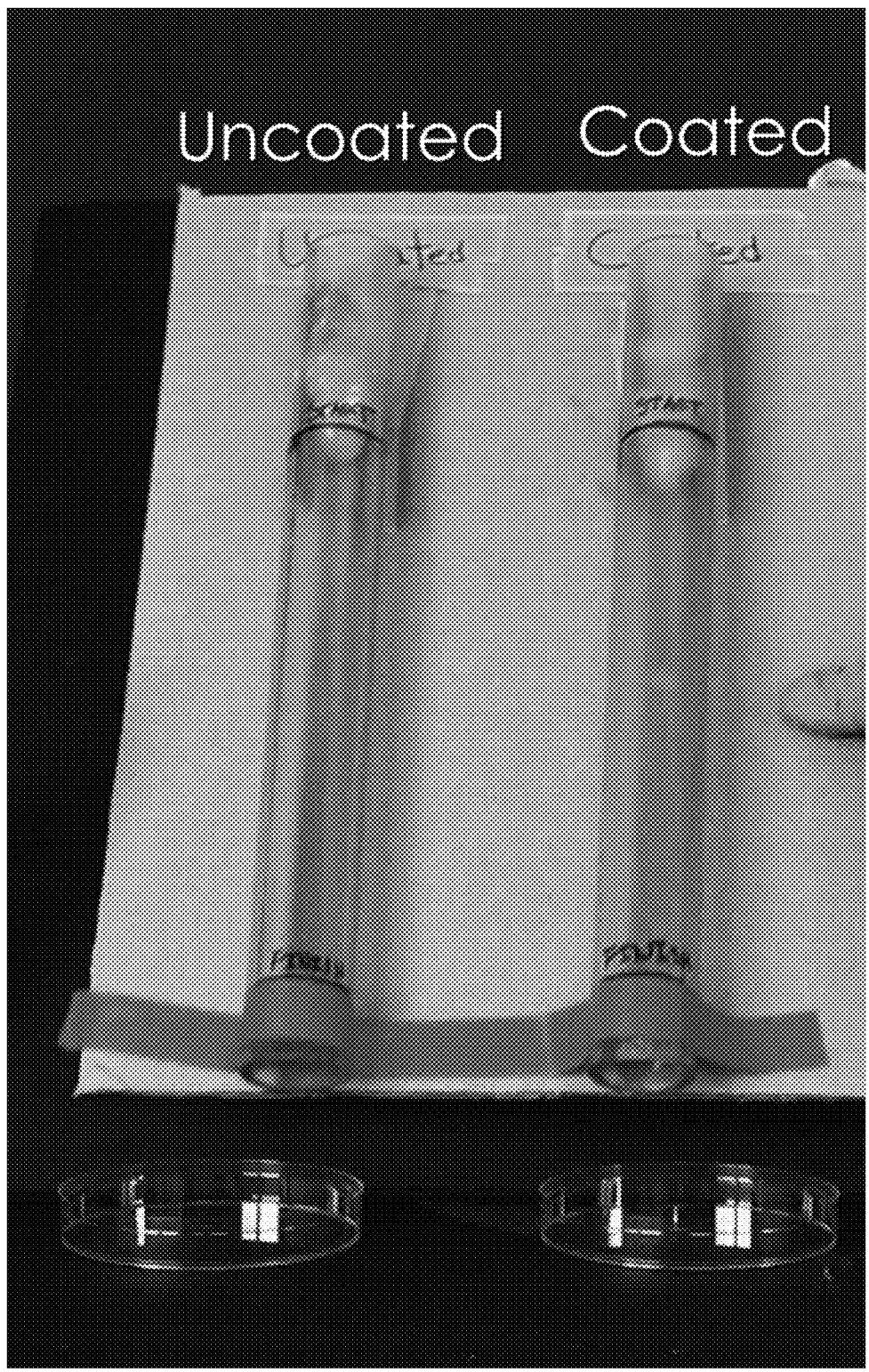
FIGS. 2A through 2F illustrate the effect of liquid-impregnated surfaces on tubes, pipes, channels, or other similar items.
Figure 2B:
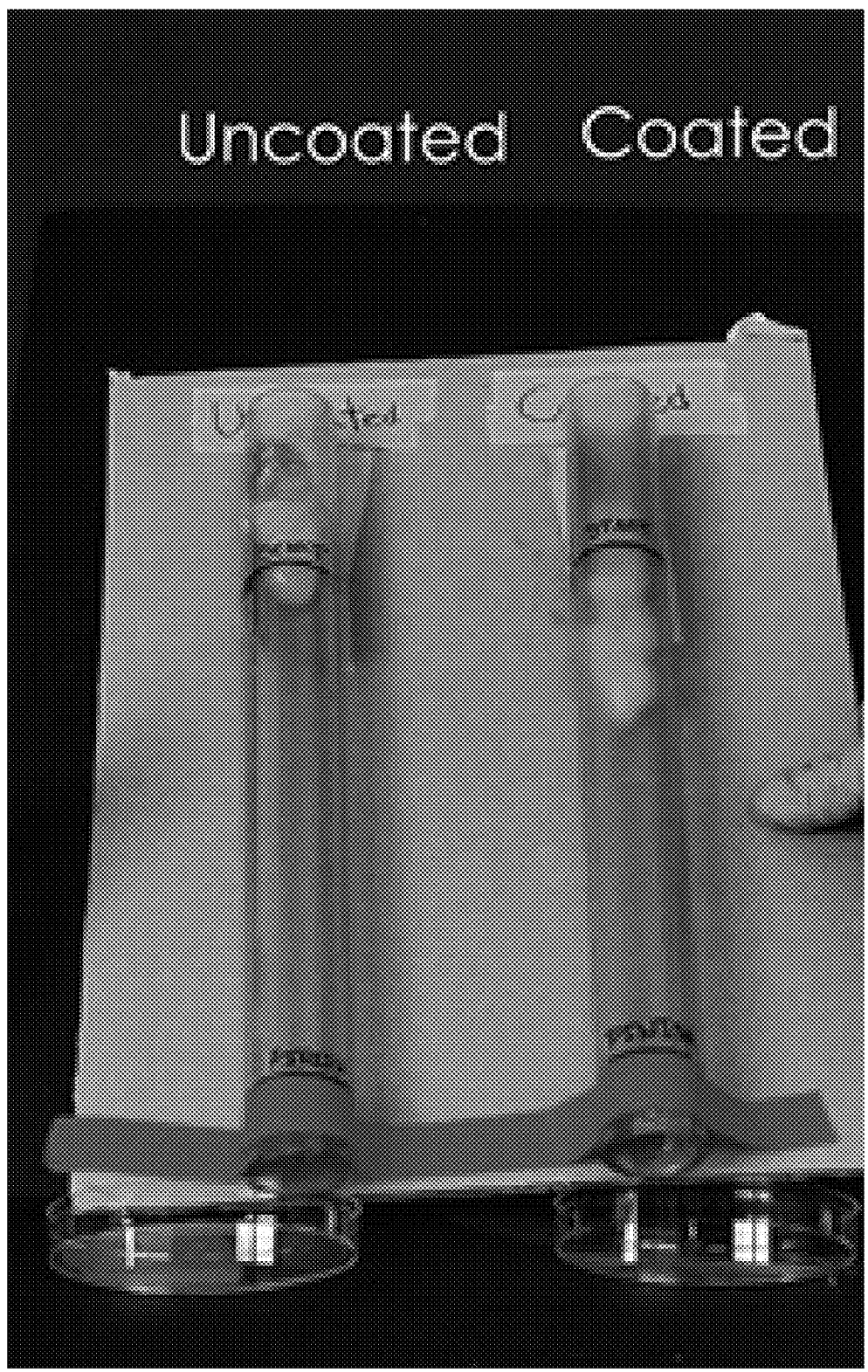
Figure 2C:
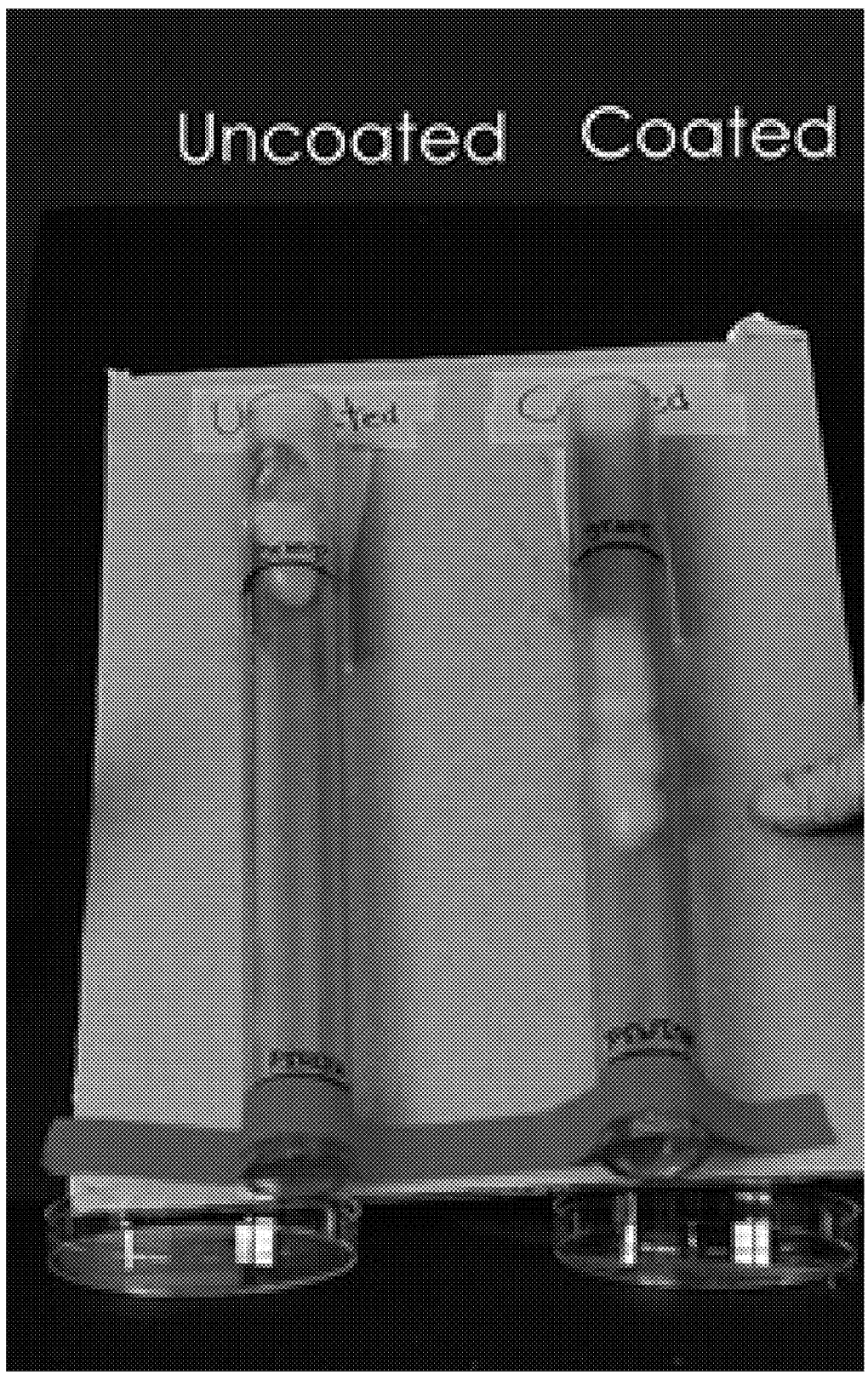
Figure 2D:
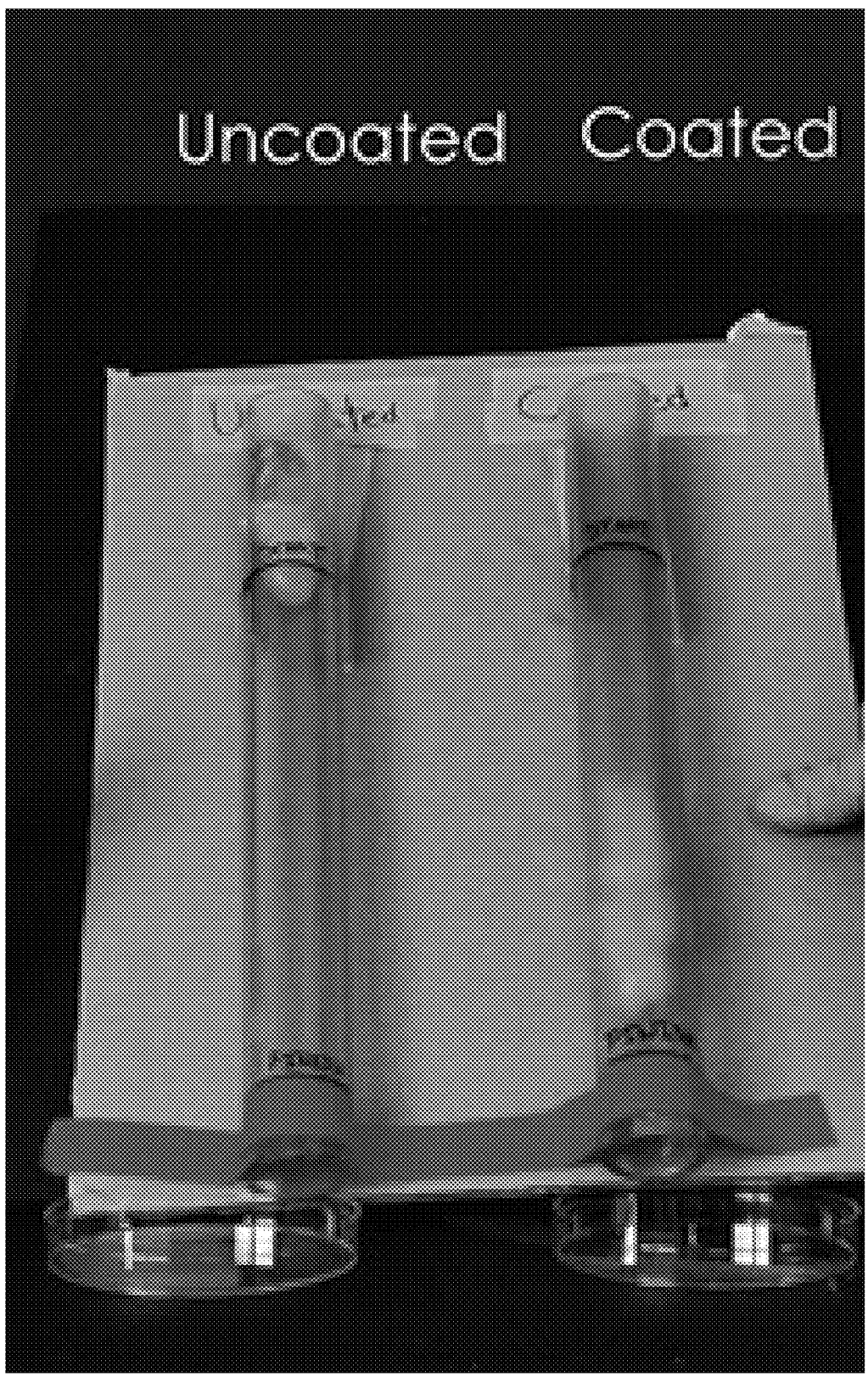
Figure 2E:
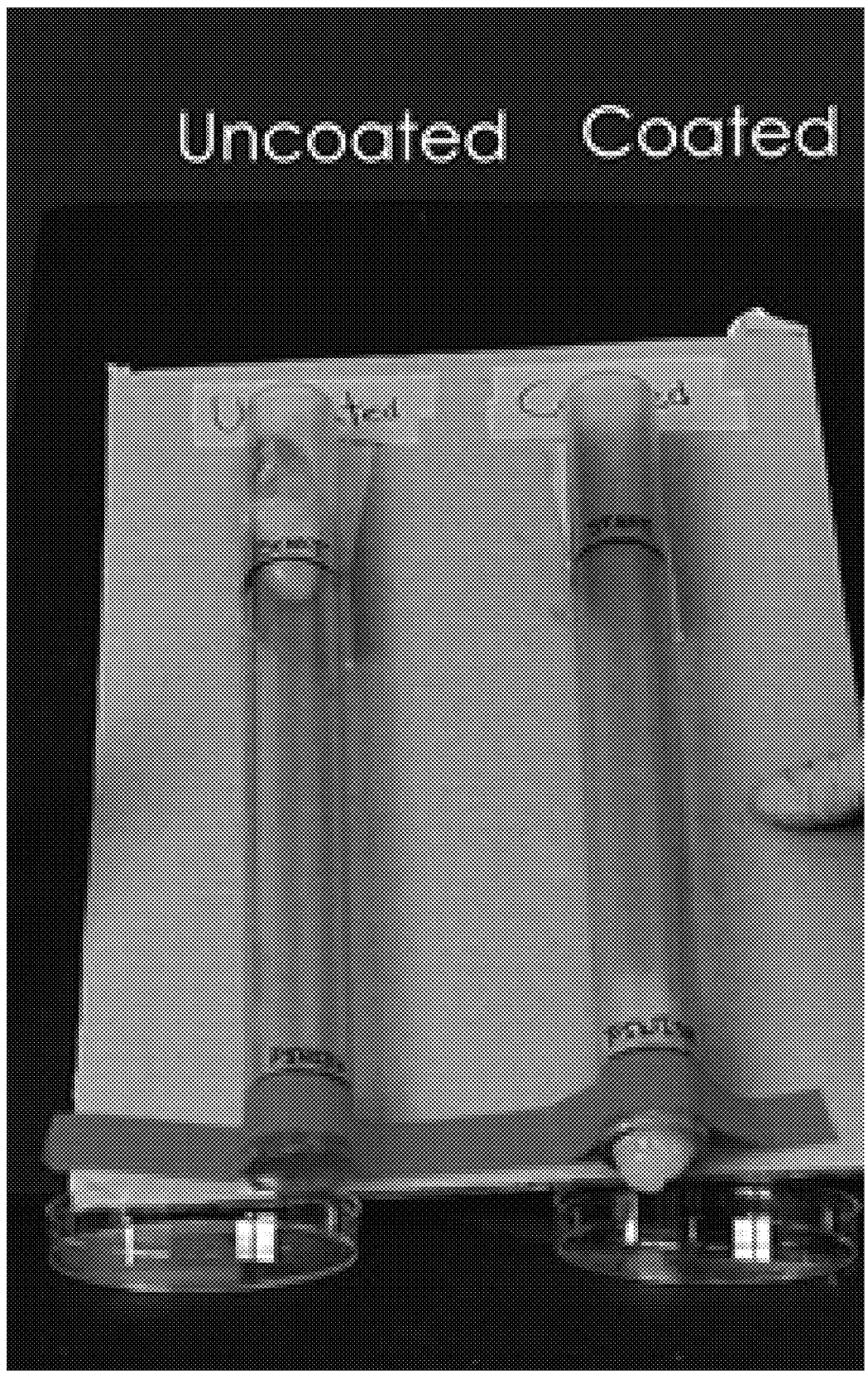
Figure 2F:
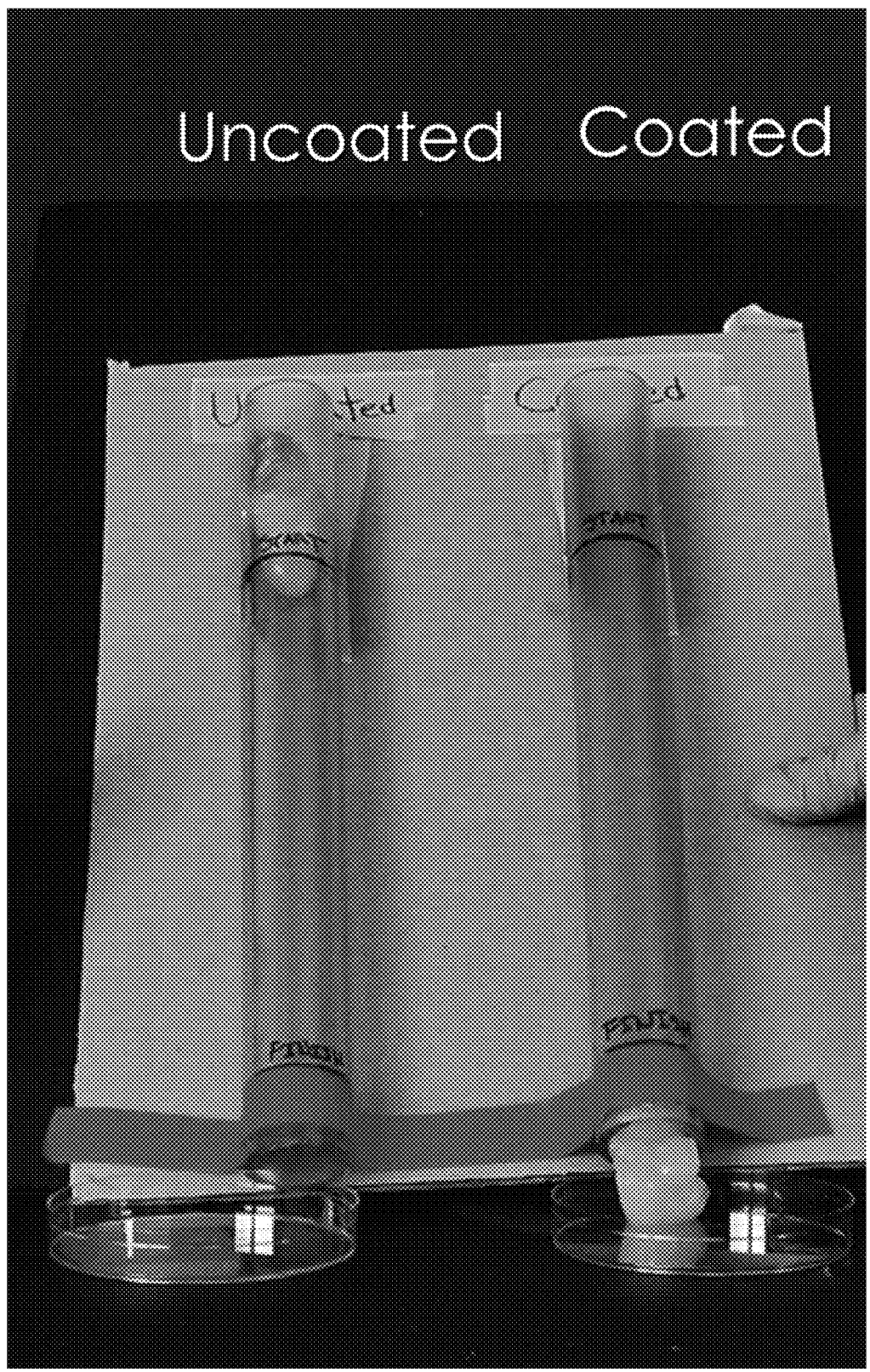

The liquid-impregnated pipe and a unmodified pipe of equal length were assembled in a pipe testing apparatus. The unmodified pipe was used as a control to assess the impact of the liquid-impregnated pipe. The two pipes were fixed to a cardboard backing use tape was shown in FIG. 2A. Labels "Start" and "Finish" were applied at the same positions on both pipes. The distance separating the labels on each pipe was 20 cm. Twenty grams of toothpaste was added at the start line of both tubes. The pipe testing apparatus was placed at a 45 degree angle and the velocity of the toothpaste as well as the time it took the toothpaste to travel 20 cm from the start to finish lines was measured. FIGS. 2B-2E illustrate the position of the toothpaste in the uncoated pipe and the coated pipe over time. FIG. 2B illustrates a total elapse time of 0.4 seconds. FIG. 2C illustrates an elapse time of 0.9 seconds during which the toothpaste in the coated pipe slide approximately 10 cm while the toothpaste in the uncoated pipe remained at the start line. FIG. 2D illustrates the toothpaste in the coated pipe near the finish line after 1.9 seconds from starting the experiment. After a total elapse time of 2.1 seconds, the toothpaste in the coated pipe is at the finish line while the toothpaste in the uncoated pipe remains at the start line as shown in FIG. 2E. After a total elapse time of 2.4 seconds, the toothpaste in the coated pipe empties out of the coated pipe while the toothpaste in the uncoated pipe remains at the start line as shown in FIG. 2F.

TABLE 1

| Trial | Time (s) | Velocity (cm/s) |
|---|---|---|
| 1 | 2.21 | 9.05 |
| 2 | 2.56 | 7.81 |
| 3 | 2.54 | 7.87 |
| 4 | 2.84 | 7.04 |
| 5 | 3.38 | 5.92 |

The experiment described in relation to FIGS. 2A-F was conducted five times. The amount of time it took the toothpaste to travel 20 cm from "Start" to "Finish" was measured for each trial. The velocity of the toothpaste was also determined. The toothpaste averaged 7.54±1.16 cm/s in the coated PVC pipe. The toothpaste did not move within the uncoated PVC pipe so the velocity was considered to be zero. The time and velocity of the toothpaste in the coated pipe is shown in Table 1.

Example 2

Figure 3A:
FIGS. 3A through 3D illustrate a mold-release experiment using concrete and a liquid-impregnated surface coated mold.
Figure 3B:

FIGS. 3A-D illustrate a mold-release experiment using concrete and a liquid-impregnated surface coated mold. A heavily detailed plastic bottle in the shape of a monkey, complete with crevices and structures, was used to demonstrate liquid-impregnated surfaces as mold release/non-stick coatings as shown in FIG. 3A. The approximately 500 ml HDPE, monkey-shaped bottle was sawed in half with a reciprocating saw to create a front half and a back half as shown in FIG. 3B. The back half of the bottle was coated with a liquid impregnated surface, described below, while the front half remained uncoated.

A liquid impregnated solution was sprayed onto the back half of the bottle. The liquid-impregnated solution was prepared by using adding 1.5 g of fluorinated wax (HF diblock grey, Toko) to 80 ml of toluene and heated on a hot plate until total dissolving of the wax. Next, the solution was sonicated for 5 minutes and was let to cool down to room temperature. Finally g of PTFE particles (1 μm size, Sigma) were added and sonicated for 5 minutes more. The solution was sprayed onto the mold to create a coating of approximately 10 um thickness, and then Galden HT 200 was sprayed to impregnate and fill the textures.

Figure 3C:
Figure 3D:
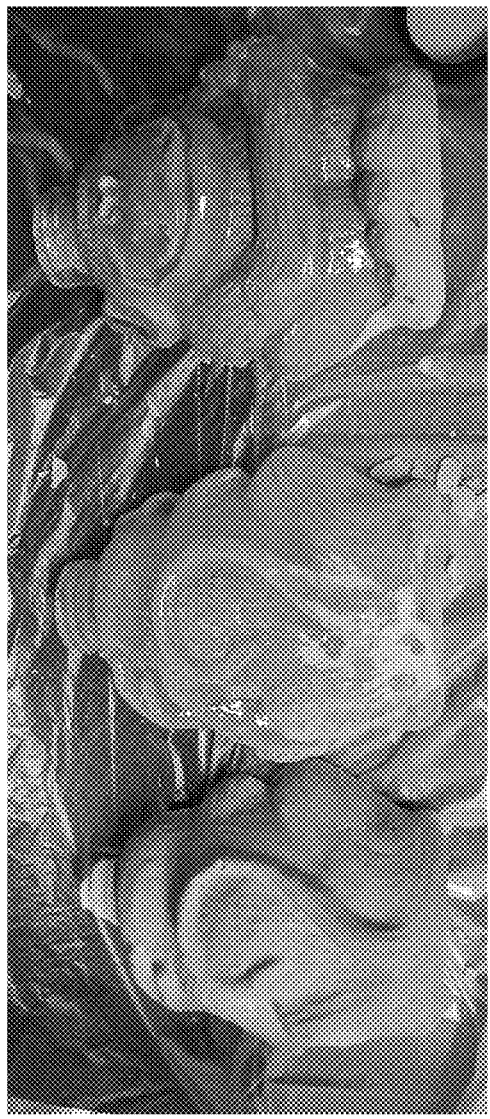

Rapid setting concrete was mixed per the manufacturer's instructions and poured into each mold until full as shown in FIG. 3C. The concrete was left to cure for approximately minutes at room temperature (70° F.) and each mold was turned upside-down on the counter. We then pulled the coated plastic mold from the hardened concrete easily and completely, leaving behind a cast of the inside of the bottle as shown in FIG. 3D. The uncoated side would not release from the mold.

Example 3

Figures 4A, 4B:
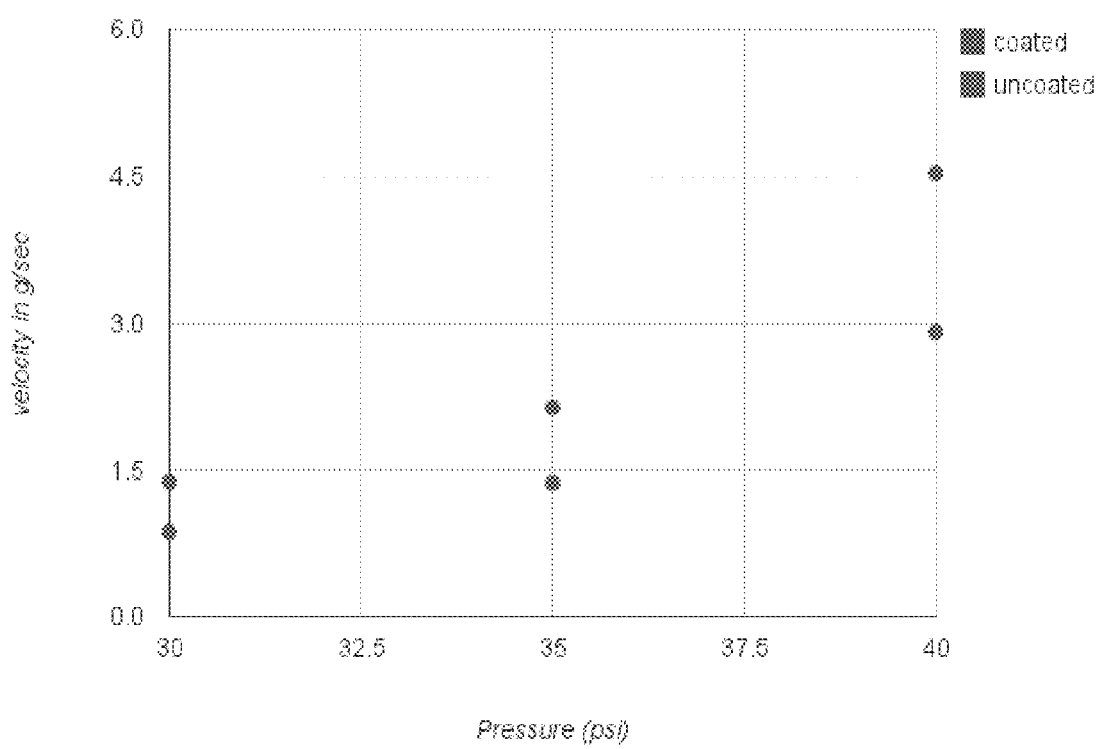
FIGS. 4A and 4B illustrates the results from an injection molding experiment.

FIGS. 4A-B illustrates the results from an injection molding experiment. Two tubes of construction adhesive (Sonolastic® 150 w/VLM Technology) were obtained and their tips cut to the same ID (7 mm) for dispensing. A solution of HF Diblock and Teflon particles (preparation previously described) was sprayed on the inside of the tips and then impregnated with Galden HT200. Each tube was then weighed. Using a pneumatic caulking gun hooked up to a gas cylinder of N2 and a regulator, experiments were performed.

In one experiment, a 6 mm diameter drill bit was used to puncture each tube and each was dispensed at three different pressures for a duration of 5 seconds. Timing began as soon as the sealant started exiting the bottle. The pressures were 30, 35, and 40 psi respectively. After each dispensing the tubes were weighed and average mass flow rates were calculated as (Mass dispensed)/(Dispense time). The results are summarized in FIGS. 4A-B. The results indicate an increased velocity for the coated nozzle over the standard nozzle of approximately 50% for the same pressure. Alternatively, for the same mass flow rate, reduced pressure is required for a nozzle with a liquid-impregnated surface at the same mass flow rate than for an uncoated nozzle. For example, in the data provided in the table and graph, the flow rate from a coated nozzle with a pressure of 30 psi as for an uncoated nozzle at 35 psi (1.38 g/s for the coated nozzles compared with 1.37 g/s for the uncoated nozzle) is nearly the same.

This indicates a reduction in power required by 14% (Power required=(Pressure)*(Mass flow rate)/(Density)). The results extend beyond nozzles, but more generally demonstrate that power to flow a material through a tube, pipe, channel, etc, can be significantly reduce the surface the material contacts with has a liquid-impregnated surface.

Example 4

FIGS. 5A-E illustrate a dust capture experiment on liquid-impregnated surfaces. Two roughly 2" squares of PET plastic were cut from a 0.040" thick sheet and weighed. One square was coated with a liquid impregnated surface comprising textured carnauba wax and ethyl oleate and the other was left uncoated as a control. The coated square was then reweighed to account for the coating.

Figure 5A:
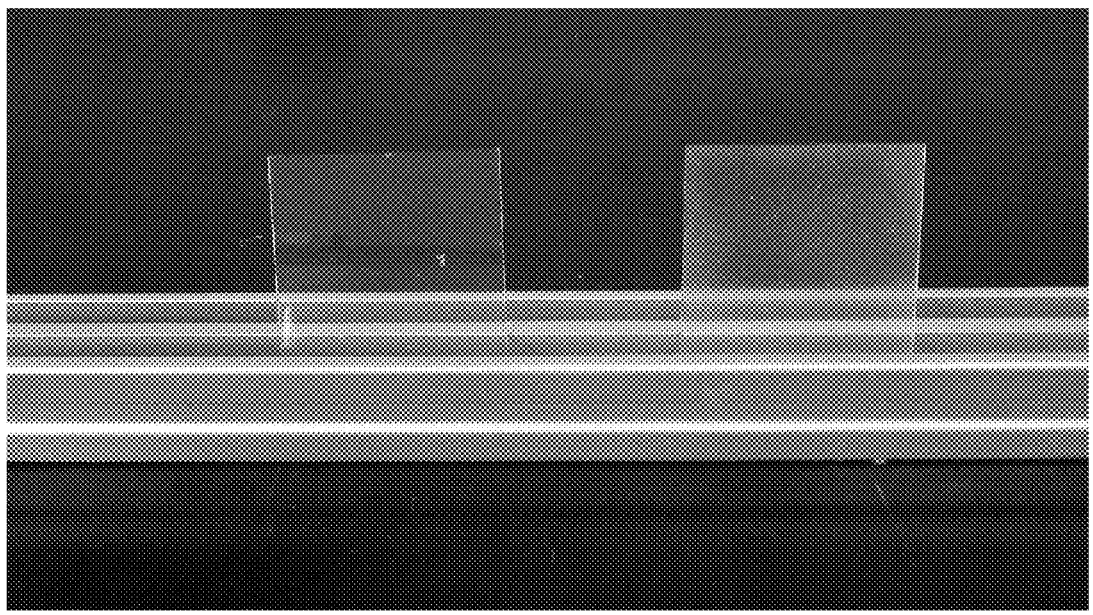
FIGS. 5A through 5D illustrate a dust capture experiment on liquid-impregnated surfaces.
Figure 5B:
Figure 5C:
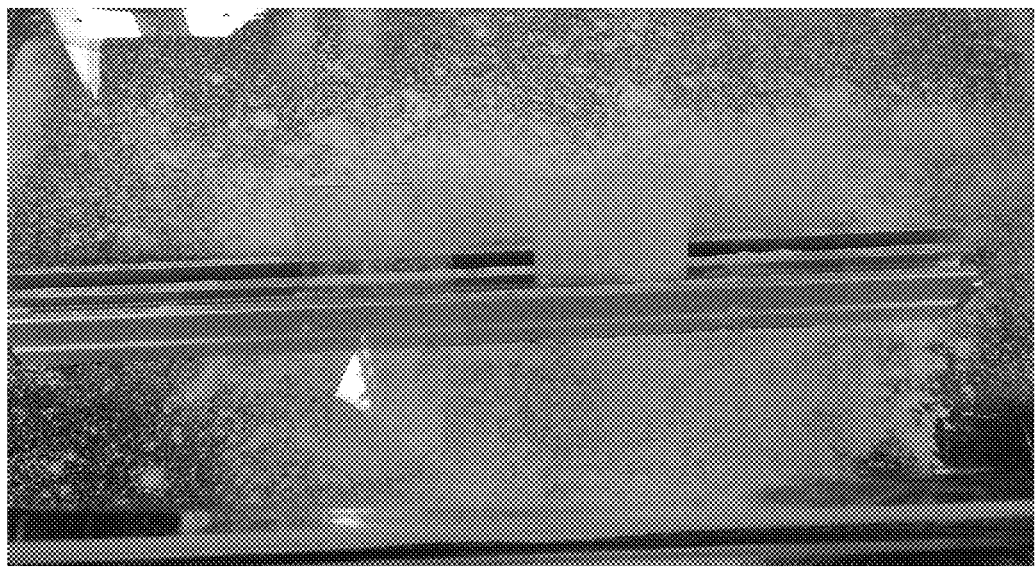
Figure 5D:
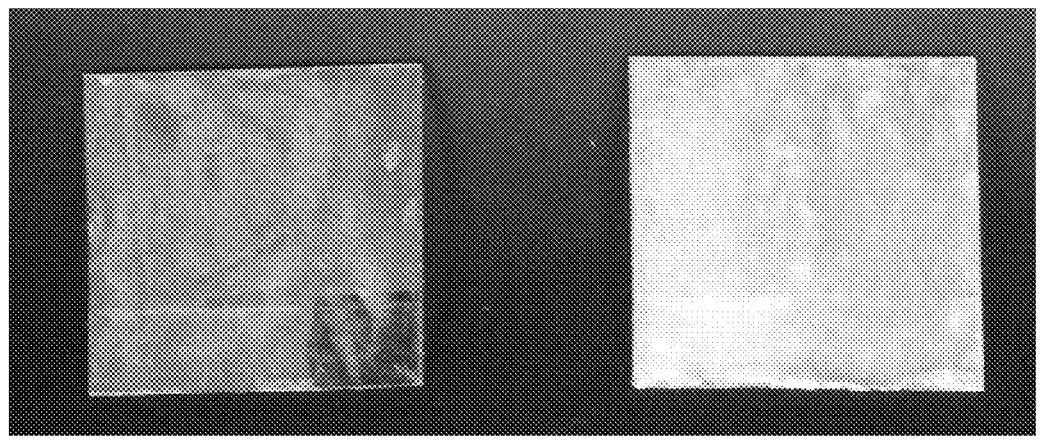

Both squares were place on an aluminum holder within a glove box as shown in FIGS. 5A and 5B. All-purpose flour was then introduced into the glove box as shown in FIG. 5C. Two handfuls were 'clapped' together to create a dust cloud, once in front of the samples and once behind. The parts were taken out of the box as shown in FIG. 5D. The parts were weighed and the weight gain from the powder was calculated to be 0.52 g for on liquid-impregnated surface compared to 0.03 g on the uncoated PET surface. The data is shown in FIG. 5E.

Example 5

FIG. 6 illustrates a solid-to-solid adhesion experiment. The lateral forces (sliding) depend on the impregnated liquid viscosity. An extremely high viscosity impregnated liquid can behave essentially as a solid, preventing sliding, and there for the surface would behave similarly to tape (FIG. 6). Low viscosity fluids slide easily, thus resulting in a surface that behave as an adhesive in the normal direction but slides laterally (Imagine an air hockey table where the mallets can easily slide but are extremely difficult to pull off).

The adhesion force was obtained by measuring the force needed to separate a liquid-impregnated surface from a glass slide in the normal direction. A glass slide was attached to the scale and the liquid-impregnated surface was pulled off of the surface in the normal direction. Capillarity forces due to the impregnated liquid resulted in adhesive strength of $\tau_{adh}=1.1\pm0.1$ Pa. The liquid-impregnated surface was prepared using a lithography patterned array of square posts of 10 um width and height, and spaced by 25 um. 10 cSt silicone oil was impregnated into the surface.

We measured the static coefficient of friction, $\mu_s$, between two solid materials with three different configurations. The first interface is silicon on PET (configuration 1), the second interface is silicon with the liquid impregnated surface (for which the normal adhesion was measured) on PET, and the third interface (configuration 3) is glass sprayed with carnauba wax to create a textured surface that was impregnated with ethyl oleate. The PET surface beneath was coated with a thin film of toothpaste to yield a chemistry that is preferentially contacted by ethyl oleate over the carnauba wax, insuring a stable liquid film between the solid materials. The coefficient of friction for each of these configuration was calculated as $\mu_s=\tan \alpha_{slide}$, where $\alpha_{side}$ is the angle at which the surface first begins to slide. A weight was attached to the top of each surface resulting in a force per unit area of the top surface of around $520\pm10$ N/m² on each surface. The slide-off angles, $\alpha_{slide}$, for configuration 1, 2, and 3, were 24°, 16°, and 7° respectively resulting in coefficients of friction, $\mu_s=\tan \alpha_{slide}$ of 0.44, 0.29, and 0.12 respectively. Thus configurations 2 and 3 both produced lower coefficients of friction than the direct solid/solid interface (configuration 1) Configuration 3, for which the chemistry of the bottom was modified with a layer of toothpaste, had the lowest friction—presumably because the a thin film of liquid (ethyl oleate) is stable between toothpaste and the carnauba wax, and therefore there was no solid-to-solid contact.

Example 6

Figure 7A:
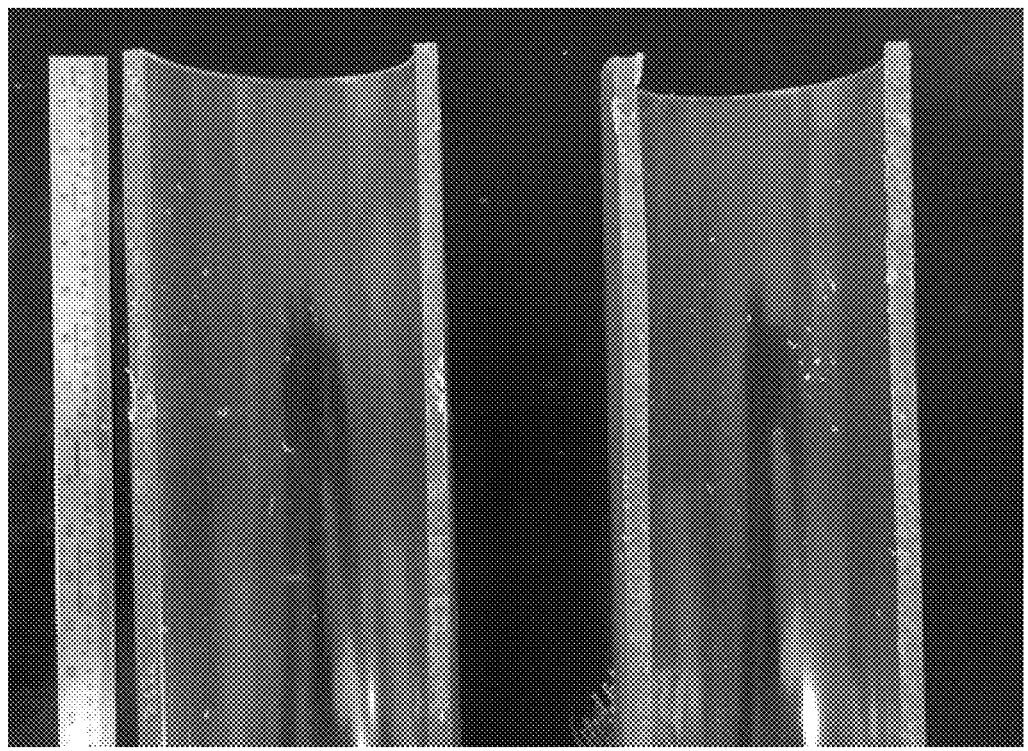
FIG. 7A through 7E illustrates a conduit experiment for demonstrating the properties of a liquid-impregnated surface on a surface that receives a viscous material.
Figure 7B:
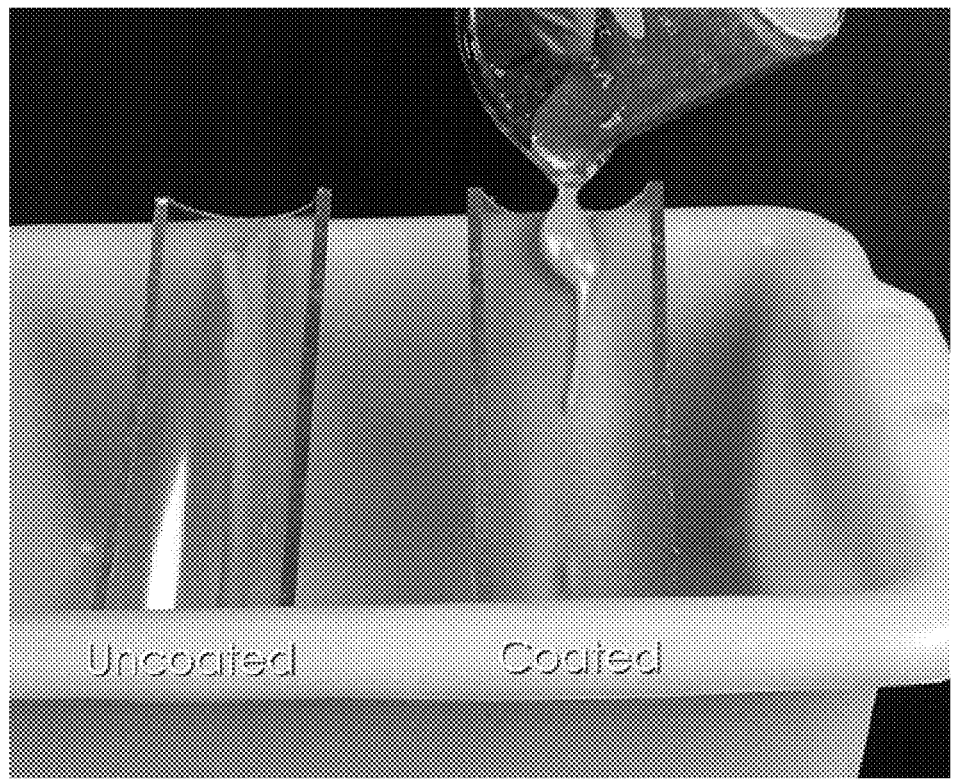
Figure 7C:
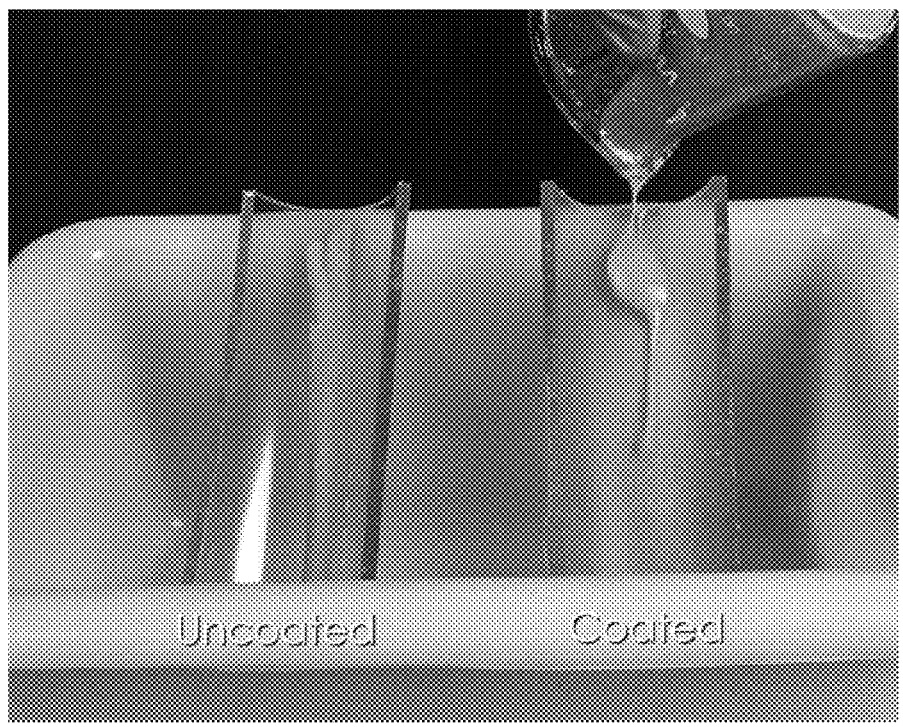
Figure 7D:
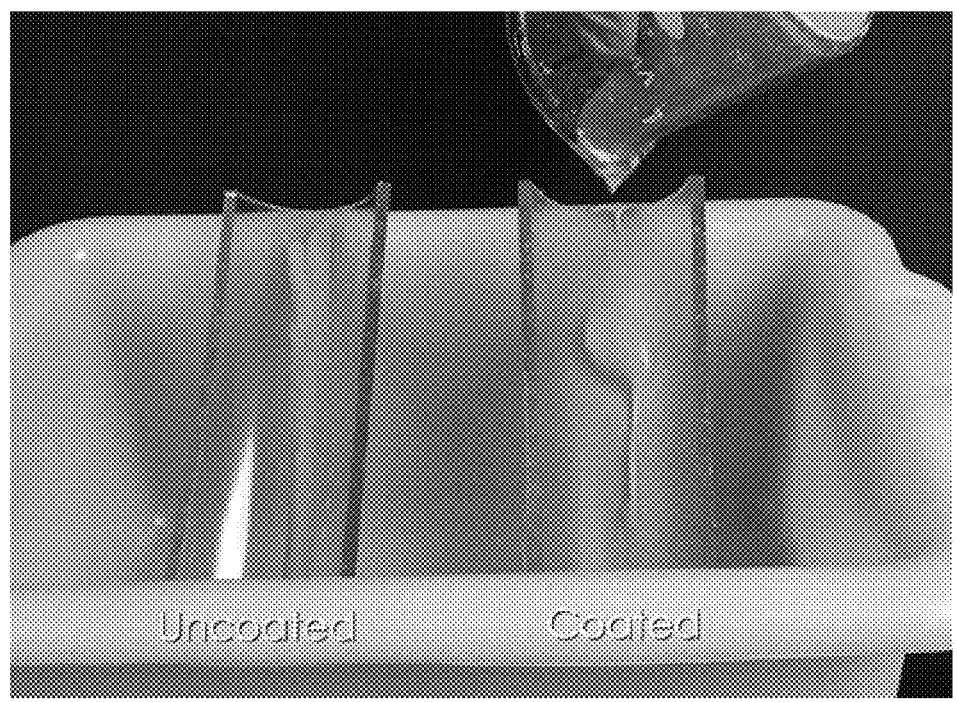
Figure 7E:
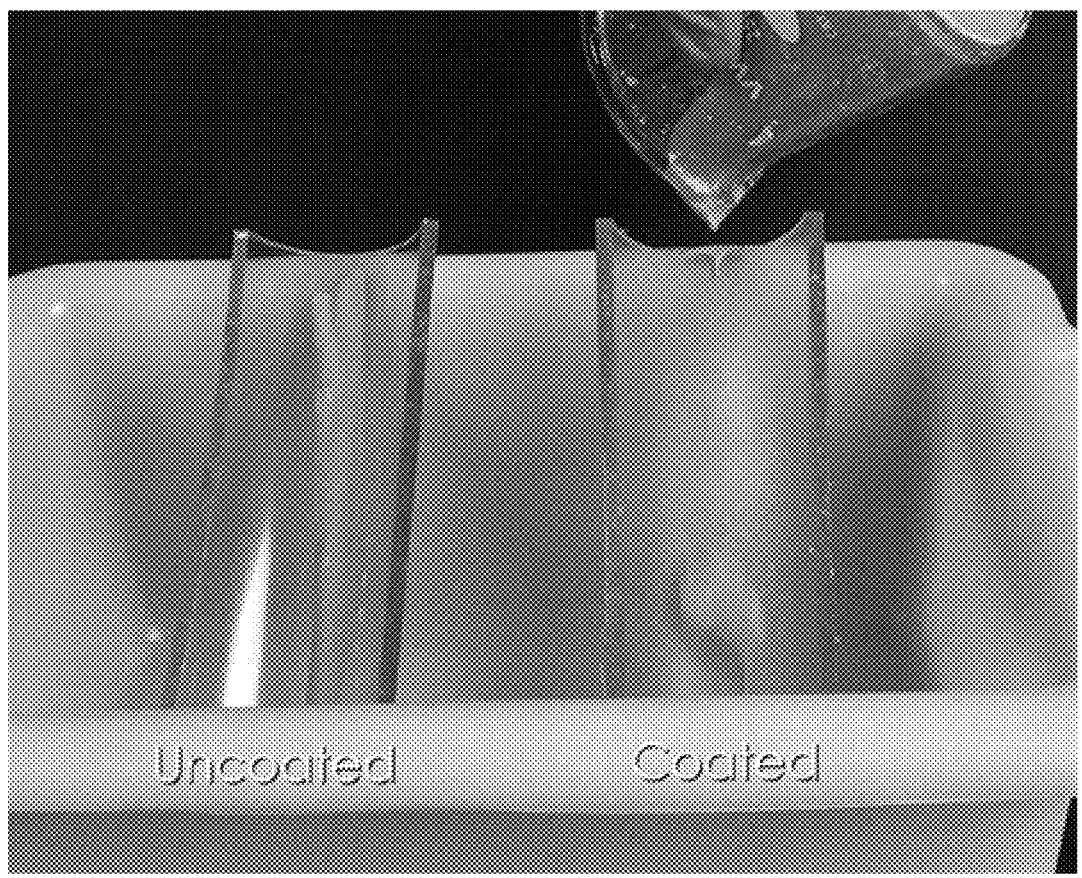

FIGS. 7A-E illustrate a conduit experiment. A 6" long, two-inch diameter PVC pipe was sawn in half lengthwise to create two "conduits" mimicking a chute used for concrete delivery as shown in FIG. 7A. The chute on the right side of FIGS. 7A-E was coated with a liquid-impregnated surface of fluorinated wax and Teflon particles (described elsewhere), and impregnated by Galden HT 200. The chute on the left side of FIGS. 7A-E remained uncoated. The chutes were place side by side in a plastic bucket at a 45°. Quick-set concrete was mixed per the manufacturer's instructions and poured down the uncoated conduit, showing that the uncured concrete sticks to the surface, not all ending up at the bottom as shown in FIGS. 7B-E. The uncured concrete is then poured down the coated conduit. All of the concrete poured down the coated conduit slide off the chute and made it to the bottom of the conduit as shown in FIGS. 7B-E. The concrete applied to the uncoated conduit traveled at a speed of approximately 20 cm/s.

Example 7

FIGS. 8A-D illustrate an experiment conducted to measure the drag on a metal sphere. Typical super-hydrophobic surfaces involve utilizing a surface roughness on a low-energy surface in order to trap air within the roughness. This air-layer can introduce a velocity-slip with a fluid flowing above the roughness features, as the air is free to move within the air pocket. This ultimately reduces the drag on the above flowing fluid of interest. Yet, as air is easily compressed, this pocket can easily collapse when a pressure/force is introduced. We demonstrate this weakness of superhydrophobic surfaces in FIG. 8A. Here a super hydrophobic aluminum sphere (method of texture creation later described), is submerged in water and pressurized from 1 atm to 2 atm and then depressurized back to 1 atm. The air film completely collapses by 2 atm, and regrows into discrete bubbles after depressurization at 1 atm. Upon collapse the surface is no longer superhydrophobic, and superhydrophobicity is not regained after depressurization. This explains why many super-hydrophobic surfaces are not robust for industrial/technical applications. Lubricant-impregnated surfaces involve incorporating a secondary fluid or lubricant, into the surface roughness in place of the air pocket. This lubricant fluid allows for the slip-condition with the primary fluid flowing above it, and is much more stable as liquids are mostly incompressible. The degree of slip can be characterized by linearly extrapolating the velocity profile and, defining a slip length, b, as the depth from the surface at which that profile extrapolates to 0. A balance of shear stresses above and below the interface indicates that.

To estimate the slip length, b, for a liquid-impregnated surface we model the system as shown in the figures. Linearly extrapolating to zero velocity, we see that the slip length is:

$$b = V_i/(du_x/dy)_o \qquad \text{Eq. 1}$$

Where $u_x$ is the fluid velocity in the x direction and $V_i$ is the velocity of the oil-water interface, and $(du_x/dy)_o$ is the velocity gradient immediately above the liquid-liquid interface. Recognizing that $V_i = t(du_x/dy)_i$ (where t is the film thickness and $(du_x/dy)_i$ is the velocity gradient within the film), and substituting this into eq. (1), we get:

$$b = t(du_x/dy)_i/(du_x/dy)_o \qquad \text{Eq. 2}$$

On the top side of the interface, the shear stress equals $\tau_o = \mu_o(du_x/dy)_o$ and on the impregnated liquid side of the interface, $\tau_i = \mu_i(du_x/dy)_i$ Since $\tau_o$ must be equal to $\tau_i$ at the oil-water interface, $\mu_o(du_x/dy)_o = \mu_i(du_x/dy)_i$. Rearranging this gives:

$$\mu_o/\mu_i = (du_x/dy)_i/(du_x/dy)_o \qquad \text{Eq. 3}$$

Plugging this into equation 2 yields.

$$b = t(\mu_o/\mu_i) \text{ or } b/t = \mu_o/\mu_i \qquad \text{Eq. 4}$$

Notice there is practically no benefit to the impregnated surface when $\mu_o/\mu_i < 1$. If this were the case, a larger slip length would be obtained by simply letting the outer liquid fill the texture, rather than impregnating it. (effectively meaning the etched texture lead to reduced drag by simply because the object was smaller in diameter by 2t). If impregnated by a more viscous liquid then the slip length is less than the coating thickness, hence the benefit is as if the solid object were smaller by less than t. This theory predicts the benefit of a liquid-impregnated surface to only be substantial (in the context of reducing drag) when $\mu_o/\mu_i > 1$.

For a sphere falling through a viscous liquid, the terminal velocity it achieves scales as $V_t \sim D^2$, however, a liquid impregnated surface effectively reduces the effective diameter of the sphere by 2b, hence we can more generally write: $V_t \sim (D-2b)^2$.

Half-inch diameter aluminum spheres were ultrasonicated with acetone and ethanol to remove dirt/contaminants. Spheres were then etched in a 2.5M HCl solution for ~8 minutes at room temperature. Following the etch, the spheres were first rinsed thoroughly in deionized water and then immersed in boiling deionized water for 20 minutes. Achieved texture on two length scales. The larger roughness is on the order of 5-20 microns and the finer texture on top is on the nanometer scale. Images of this texture are provided in FIG. 8B. From equation 4 we estimate a slip length of approximately 1.1 mm for 10 μm roughness.

Three types of samples were tested. Regular smooth aluminum spheres, super-hydrophobic aluminum spheres, and lubricant-impregnated aluminum spheres, all with 0.5" diameter. Super-hydrophobic spheres were textured with aforementioned texturing process, and then treated with a low-energy silane (octadecyltrichlorosilane-OTS). Lubricant-impregnated samples were textured with the aforementioned texturing process, treated with OTS, and lastly impregnated with a 10 cSt silicone oil by slowly dipping them into reservoirs of the lubricant.

Samples were then carefully dropped into a large bath of glycerin (~1100 cSt). A rectangular container was used to avoid visual distortions of the falling spheres due to the curvature of the container. A pair of sample tweezers was fixed above the container in order to carefully drop the samples directly downward and in the same place each trial. This proved to enhance repeatability of the experiments. Water-glycerin mixtures have been used to vary the viscosity of the bath liquid from pure water (1 cSt) to pure glycerin (~1100 cSt).

A high-speed camera was used to capture the spheres falling through the bath liquid as shown in FIG. 8C. Once the sphere has reached terminal velocity, the forces of the sphere are in balance (gravity, drag and buoyancy). The spheres in our experiments generally reach constant, terminal velocity within a few centimeters.

Figure 8A:
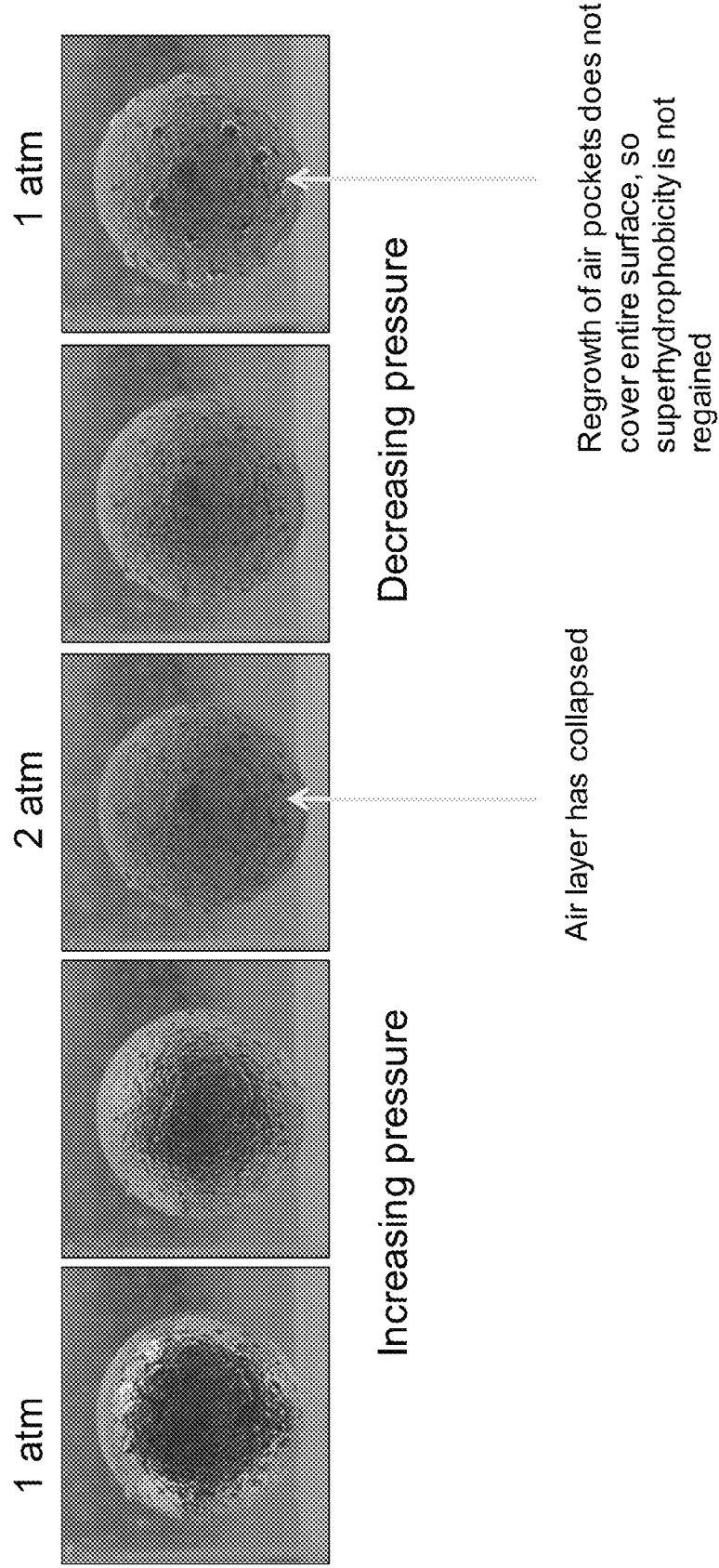
Figure 8D:
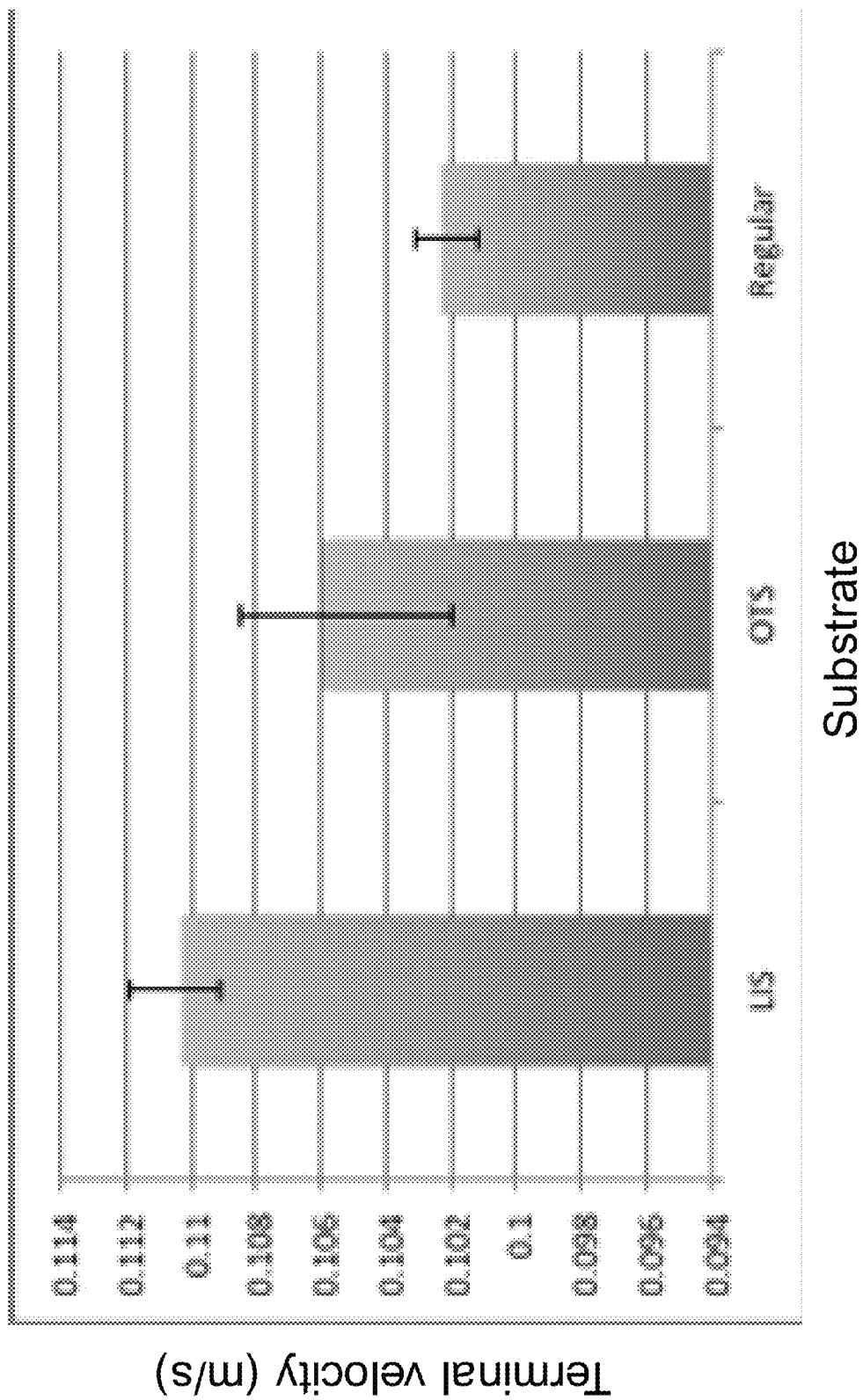

We have been able to show an increase in the terminal velocity (reduction in drag) of the falling aluminum spheres by utilizing an impregnated lubricant in the texture of the spheres as shown in FIG. 8D.

Example 8

FIG. 9 illustrates two experiments conducted to measure the wetting behavior on a metal sphere. The experiments were conducted with three spheres. The first sphere was a sphere with a smooth surface ("regular"). The second sphere was a sphere with an outer textured surface ("OTS"). The third sphere consisted of a sphere with an liquid-impregnated outer surface ("LTS"). In the first experiment, each sphere was partially submerged in water as shown in the FIG. 9. In the second experiment, each sphere was immersed in water as shown in FIG. 9. The wetting behavior of each sphere is shown in FIG. 9.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A conduit for conveying fluids and/or solids, the conduit having an interior surface comprising an impregnating liquid and a plurality of micro-scale and/or nano-scale solid features spaced sufficiently close to stably contain the impregnating liquid therebetween, wherein said impregnating liquid fills spaces between said solid features, wherein said interior surface stably contains said impregnating liquid between said solid features, wherein said impregnating liquid is substantially held in place between said plurality of solid features regardless of orientation of said interior surface and regardless of flow, passage, or removal of fluids and/or solids through, into, or out of said conduit, said interior surface configured to provide a high-slip boundary condition at said interior surface, thereby facilitating the flow, passage, or removal of fluids and/or solids through, into, or out of said conduit, and wherein the conduit comprises a reservoir for containing liquid for replenishing impregnating liquid lost from the liquid-impregnated surface.

2. The conduit of claim 1, wherein the conduit is a tube, pipe, or channel.

3. The conduit of claim 1, wherein the conduit is a nozzle.

4. The conduit of claim 1, wherein the conduit is a mold, including wherein the mold is part of an injection molding apparatus or is part of an extruder.

5. The conduit of claim 1, wherein the conduit is a canister or vessel.

6. An apparatus comprising the conduit of claim 1.

7. The conduit of claim 1, wherein the impregnating liquid comprises at least one member selected from the group consisting of ethyl oleate, an ester, a fatty acid, a fatty acid derivative, a vegetable oil, phenyl isothiocyanate, a terpene, bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin, ethylene dibromide, carbon disulfide, bromoform, methylene iodide (di-iodomethane), stanolax, Squibb's liquid petrolatum, p-bromotoluene, monobromobenzene, perchloroethylene, carbon disulfide, phenyl mustard oil, monoiodobenzene, alpha-monochloronaphthalene, acetylene tetrabromide, aniline, butyl alcohol, isoamyl alcohol, n-heptyl alcohol, cresol, oleic acid, linoleic acid, amyl phthalate, silicone oil, a perfluorocarbon liquid, a perfluorofluorinated vacuum oil, a fluorinated coolant, an ionic liquid, a fluorinated ionic liquid that is immiscible with water, a silicone oil comprising PDMS, a fluorinated silicone oil, a liquid metal, an electrorheological fluid, a magneto-rheological fluid, a ferrofluid, a dielectric liquid, a hydrocarbon liquid, a fluorocarbon liquid, a refrigerant, a vacuum oil, a phase-change material, a semi-liquid, grease, synovial fluid, and a bodily fluid.

8. The conduit of claim 1, wherein the solid features comprise one or more members selected from the group consisting of wax, carnauba wax, beeswax, candelilla wax, zein (from corn), dextrin, cellulose ether, hydroxyethyl cellulose, hydroxypropyl cellulose (HPC), hydroxyethyl methyl cellulose, hydroxypropyl methyl cellulose (HPMC), ethyl hydroxyethyl cellulose, insoluble fiber, purified wood cellulose, micro-crystalline cellulose, kaolinite (clay mineral), Japan wax, pulp, ferric oxide, iron oxide, sodium formate, sodium oleate, sodium palmitate, sodium sulfate, silica, glass, a metal, a polymer, a ceramic solid, a fluorinated solid, an intermetallic solid, a composite solid, PDMS, cyclic olefin polymer, polypropylene, PVC, PET, HDPE, polyimide, PMMA, glass, Perspex, Plexiglass, Polymacon, a hydrocarbon, a fluoropolymer, teflon, trichloro(1H,1H,2H, 2H-perfluorooctyl)silane (TCS), octadecyltrichlorosilane (OTS), heptadecafluoro-1,1,2,2-tetrahydrodecyltrichlorosilane, fluoroPOSS, a ceramic an intermetallic compound, and a composite.

9. The conduit of claim 1, wherein the solid features comprise or define at least one member selected from the group consisting of particles, amorphous particles, substantially spherical particles, posts, nanoneedles, microneedles, nanograss, micrograss, pores, cavities, wells, interconnected pores, interconnected cavities, grooves, and ridges.

10. The conduit of claim 1, wherein the impregnating liquid comprises an additive to prevent or reduce evaporation of the impregnating liquid.

11. The conduit of claim 1, wherein the solid features comprise one or more members selected from the group consisting of wax, carnauba wax, beeswax, and candelilla wax.

12. The conduit of claim 1, wherein the solid features comprise one or more members selected from the group consisting of cellulose, cellulose ether, hydroxyethyl cellulose, hydroxypropyl cellulose (HPC), hydroxyethyl methyl cellulose, hydroxypropyl methyl cellulose (HPMC), and ethyl hydroxyethyl cellulose.

13. The conduit of claim 1, wherein the solid features comprise one or more members selected from the group consisting of PDMS, cyclic olefin polymer, polypropylene, PVC, PET, HDPE, polyimide, PMMA, glass, Perspex, Plexiglass, Polymacon, a hydrocarbon, and a fluoropolymer, and teflon.

14. The conduit of claim 1 wherein the solid features comprise one or more members selected from the group consisting trichloro(1H,1H,2H,2H-perfluorooctyl)silane (TCS), octadecyltrichlorosilane (OTS), heptadecafluoro-1,1,2,2-tetrahydrodecyltrichlorosilane.

15. The conduit of claim 1, wherein the solid features comprise one or more members selected from the group consisting ferric oxide and iron oxide.

16. The conduit of claim 1, wherein the solid features comprise one or more members selected from the group consisting of a metal and an intermetallic solid.

17. The conduit of claim 1, wherein the solid features comprise a composite solid.

18. The conduit of claim 1, wherein the impregnating liquid comprises at least one member selected from the group consisting of a fatty acid derivative and a vegetable oil.

19. The conduit of claim 1, wherein the impregnating liquid comprises silicone oil.

20. The conduit of claim 1, wherein the impregnating liquid comprises a water-based liquid comprising a perfluorocarbon liquid.

21. The conduit of claim 1, wherein the solid features comprise one or more members selected from the group consisting of a composite solid and PDMS and the impregnating liquid comprises a silicone oil comprising PDMS.

22. The conduit of claim 1, wherein the solid features comprise one or more members selected from the group consisting of polypropylene, a hydrocarbon, and HDPE, and the impregnating liquid comprises a hydrocarbon liquid.

23. The conduit of claim 1, wherein the solid features comprise particles having an average dimension in a range of 1 micron to 50 microns.

24. The conduit of claim 23, wherein the particles are arranged with average spacing of about 1 microns to about 30 microns-between adjacent particles or clusters of particles.

25. The conduit of claim 23, wherein the particles are spray-deposited.

* * * * *